(12) United States Patent
Mouri et al.

(10) Patent No.: US 6,424,468 B1
(45) Date of Patent: Jul. 23, 2002

(54) EYEPIECE LENS

(75) Inventors: Motohisa Mouri, Kawasaki; Kouichi Oshita, Tokyo; Hitoshi Nozaki, Natori, all of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/945,674

(22) Filed: Sep. 5, 2001

(30) Foreign Application Priority Data

| Sep. 5, 2000 | (JP) | 2000-269193 |
| Sep. 6, 2000 | (JP) | 2000-270687 |
| Aug. 23, 2001 | (JP) | 2001-252345 |

(51) Int. Cl.$^7$ ............ G02B 25/00; G02B 15/14
(52) U.S. Cl. ............ 359/645; 359/646; 359/643; 359/690; 359/432
(58) Field of Search ............... 359/643–647, 359/683, 690, 785, 432, 422–424

(56) References Cited

U.S. PATENT DOCUMENTS

| 4,348,090 A | * | 9/1982 | Iizuka | 396/385 |
| 4,509,831 A | * | 4/1985 | Nishioka | 359/645 |
| 4,664,485 A | * | 5/1987 | Momiyama et al. | 359/645 |
| 5,086,353 A | * | 2/1992 | Mukai et al. | 359/422 |
| 5,305,147 A | * | 4/1994 | Hasegawa et al. | 359/644 |
| 5,495,365 A | * | 2/1996 | Morooka | 359/331 |
| 6,229,653 B1 | * | 5/2001 | Kanai | 359/643 |

FOREIGN PATENT DOCUMENTS

| JP | 57-150813 A | * | 9/1982 | 359/643 |
| JP | 57-201214 A | * | 12/1982 | 359/645 |
| JP | 58-5710 A | * | 1/1983 | 359/645 |
| JP | 61-19968 | | 5/1986 | |

* cited by examiner

*Primary Examiner*—Evelyn A Lester
(74) *Attorney, Agent, or Firm*—Miles & Stockbridge P.C.

(57) ABSTRACT

In order to provide an eyepiece lens which has a sufficiently long eye relief and a high magnification, there is provided an eyepiece lens for observing an image formed by an objective lens through an erect system, at least comprising a first lens group 4 having a positive refracting power and a second lens group 3 having a negative refracting power in this order from the side of an observer, and satisfying the following condition:

$$-3 < SF1 < -1 \qquad (1)$$

where SF1 indicates a shape factor of the first lens group 4, and SF indicates a shape factor of the lens group, which is defined by:

$$SF = (Rs + RE)/(Rs - RE),$$

where Rs indicates a radius of curvature of a lens surface which is closest to the object side and RE indicates a radius of curvature of a lens surface which is closest to the observer side.

15 Claims, 22 Drawing Sheets

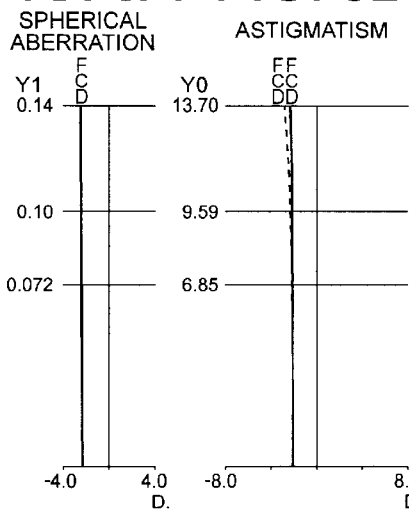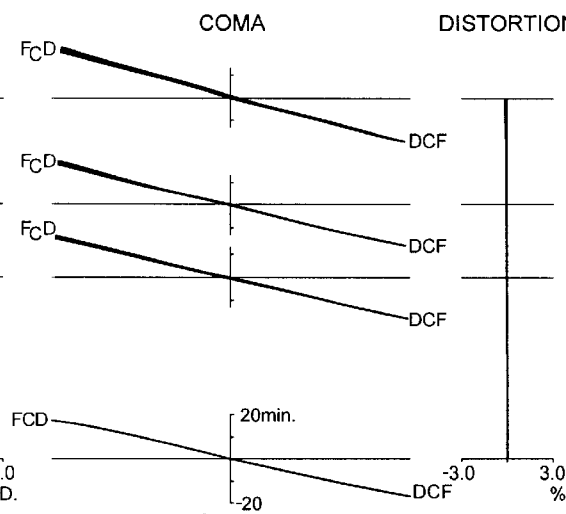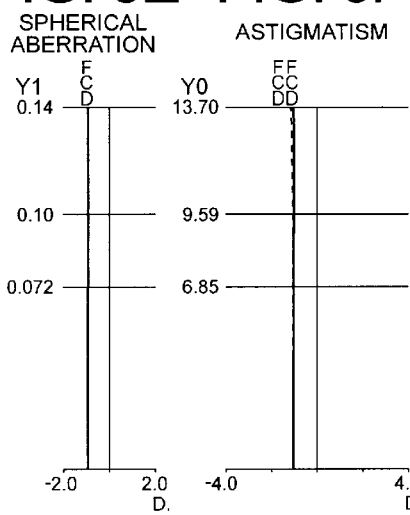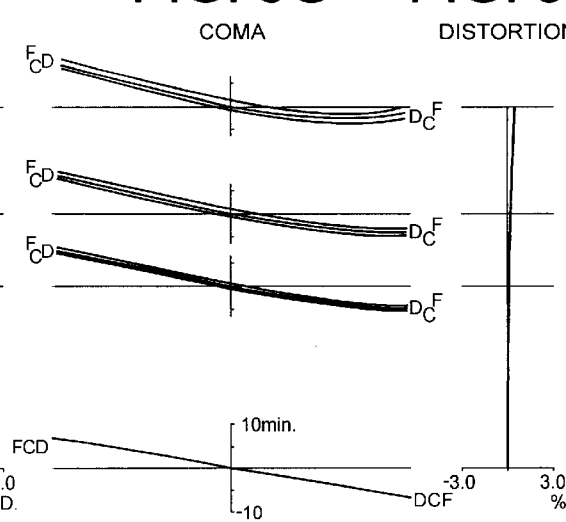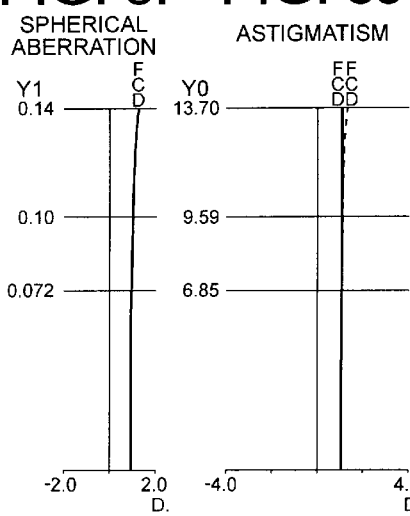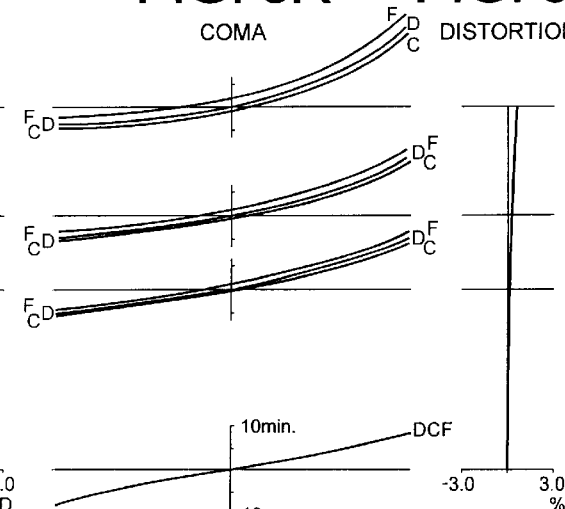

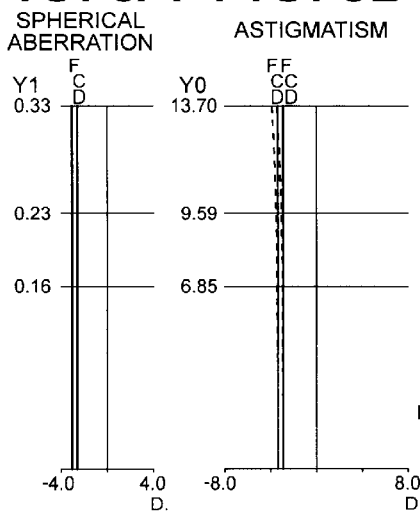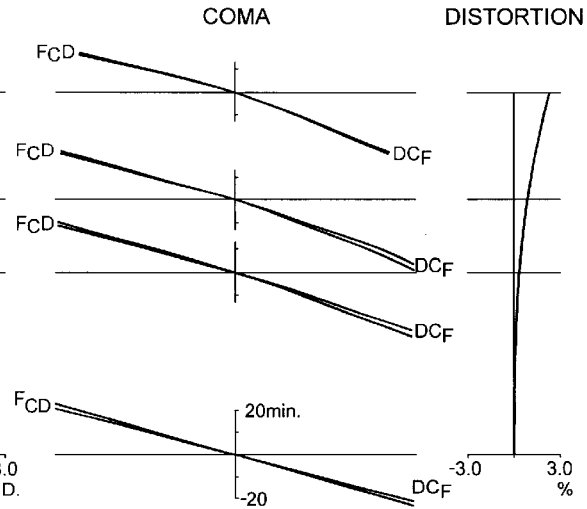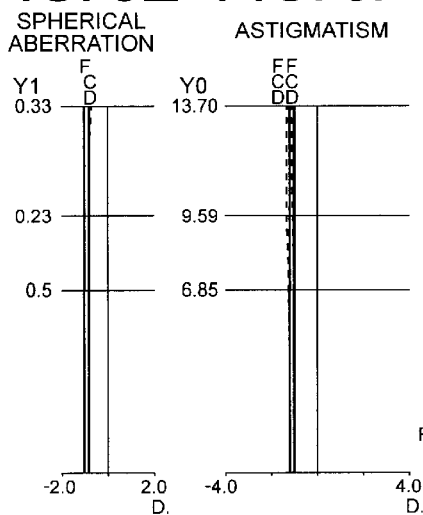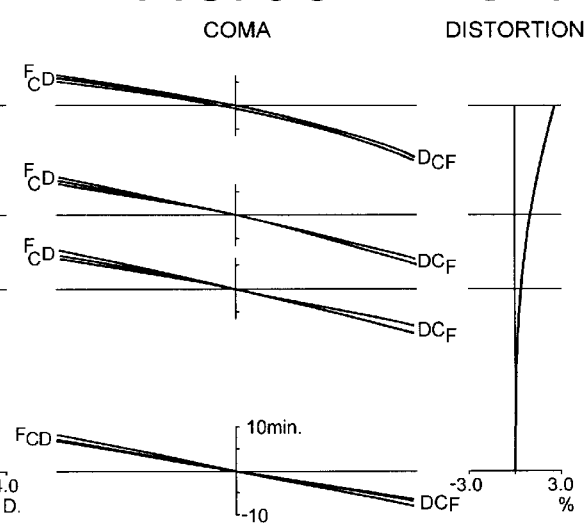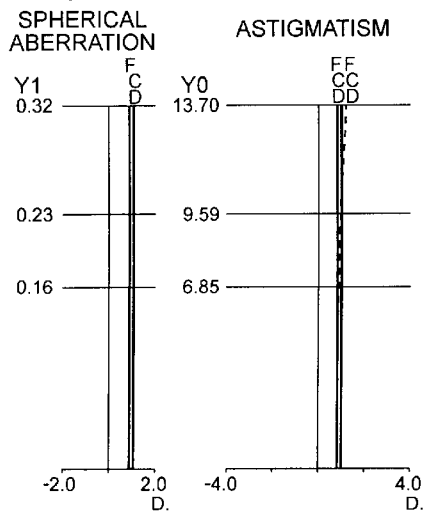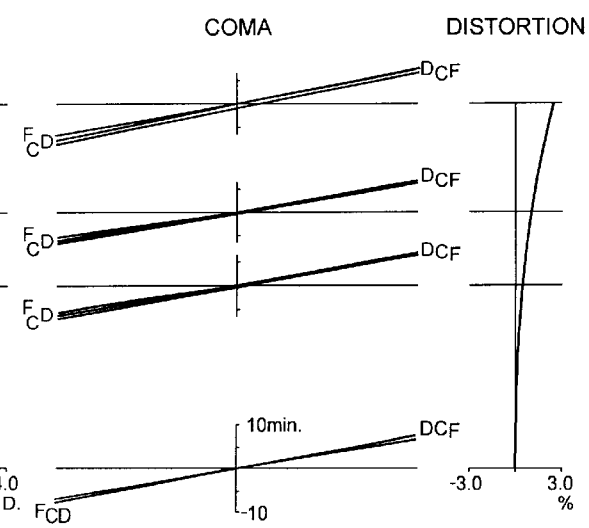

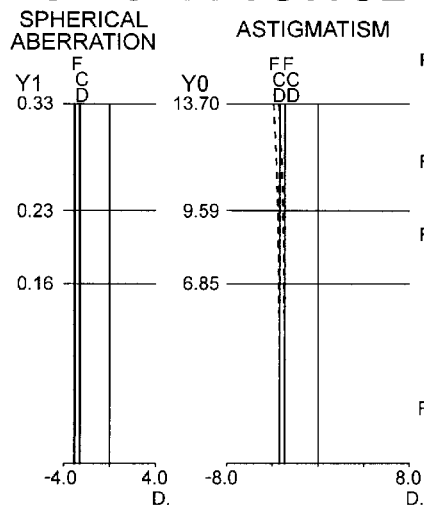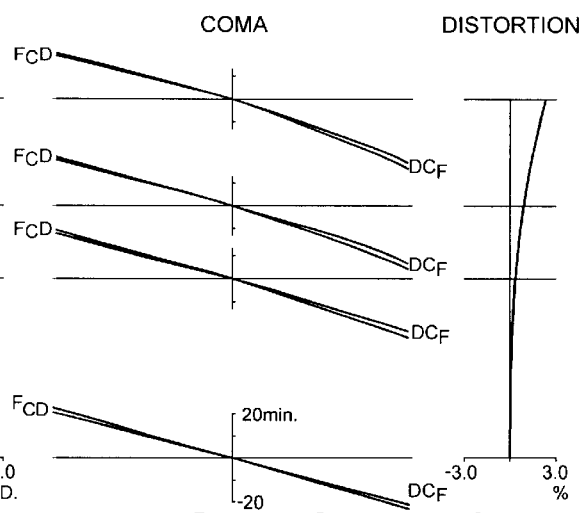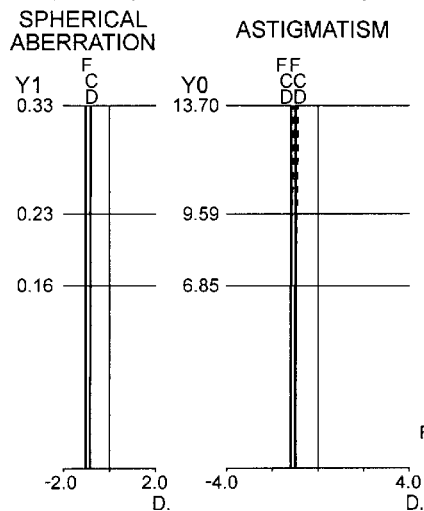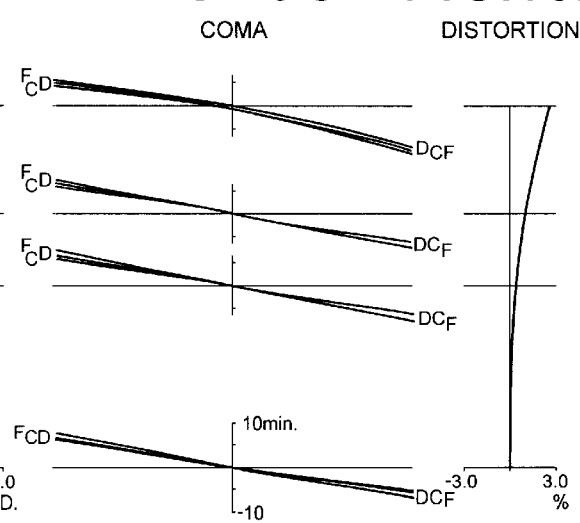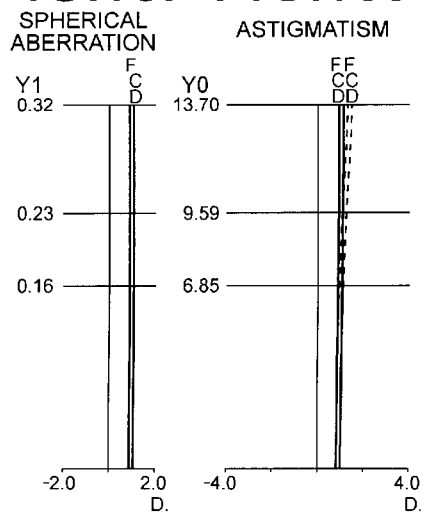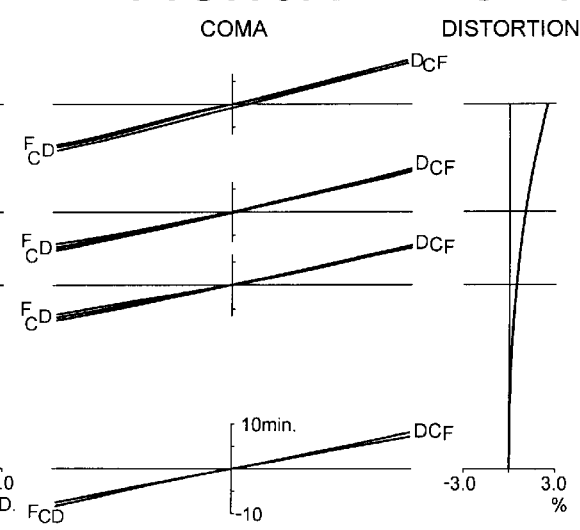

FIG.12A  FIG.12B   FIG.12C   FIG.12D
SPHERICAL ABERRATION | ASTIGMATISM | COMA | DISTORTION
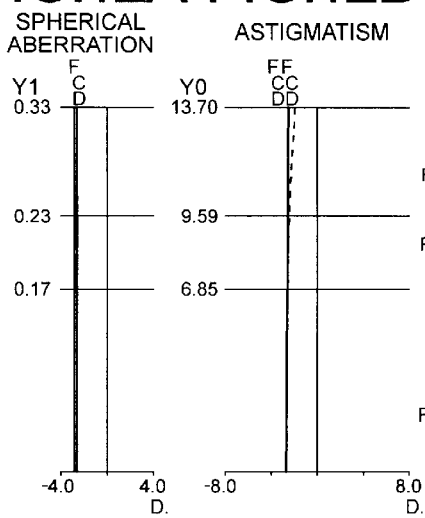
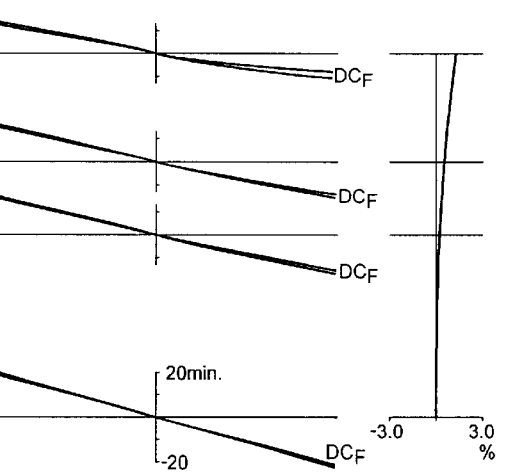
FIG.12E  FIG.12F   FIG.12G   FIG.12H
SPHERICAL ABERRATION | ASTIGMATISM | COMA | DISTORTION
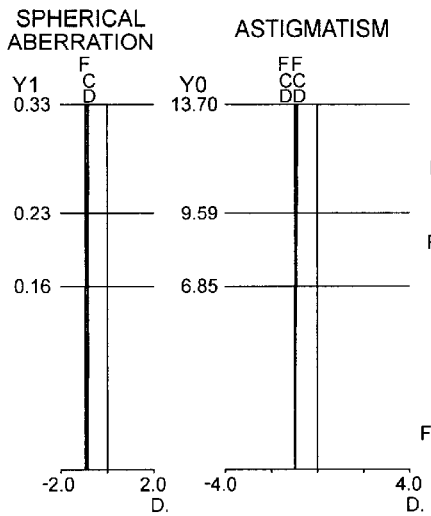
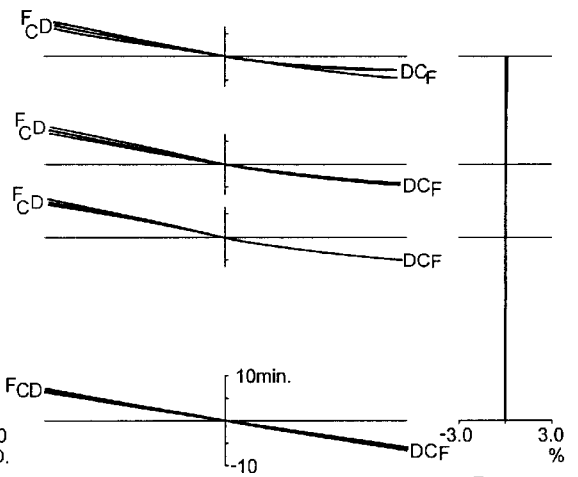
FIG.12I  FIG.12J   FIG.12K   FIG.12L
SPHERICAL ABERRATION | ASTIGMATISM | COMA | DISTORTION
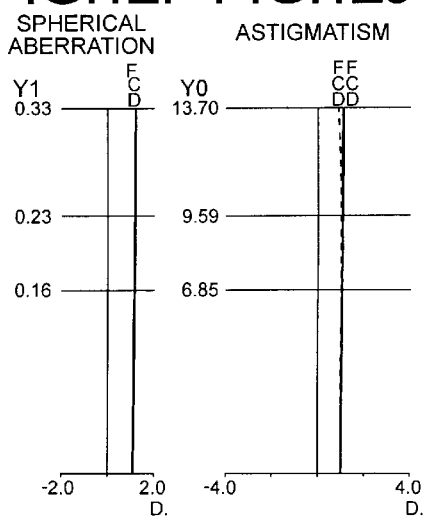
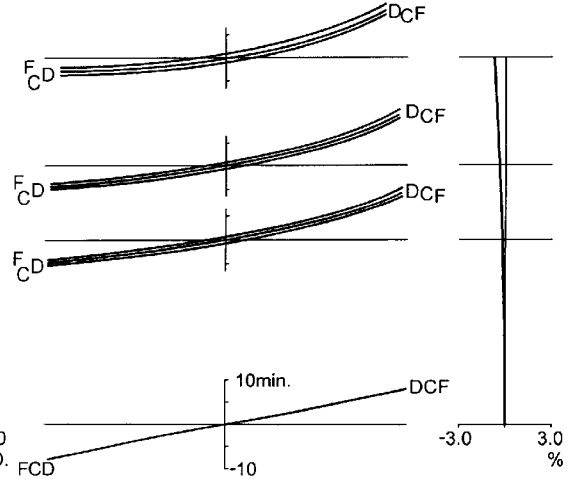

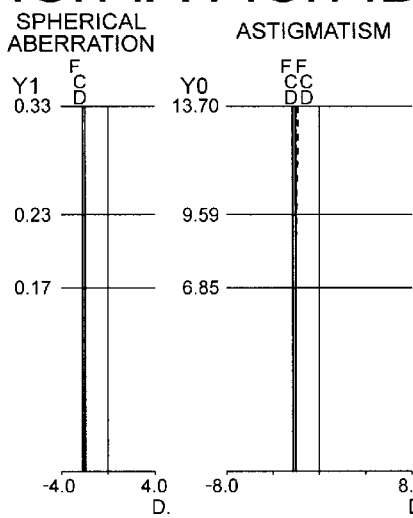
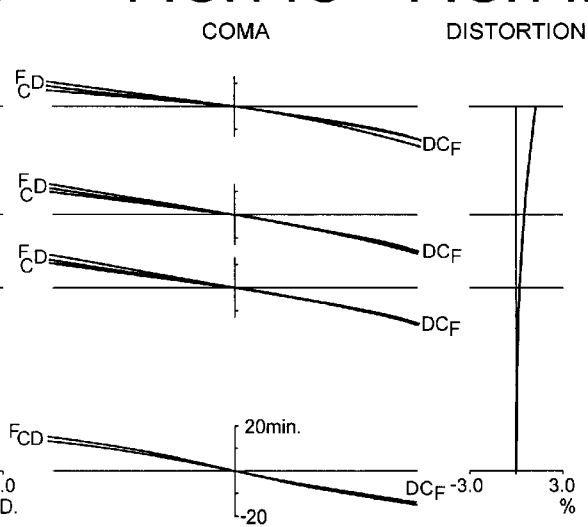
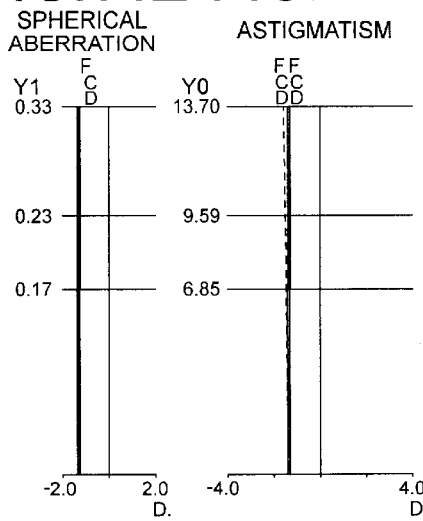
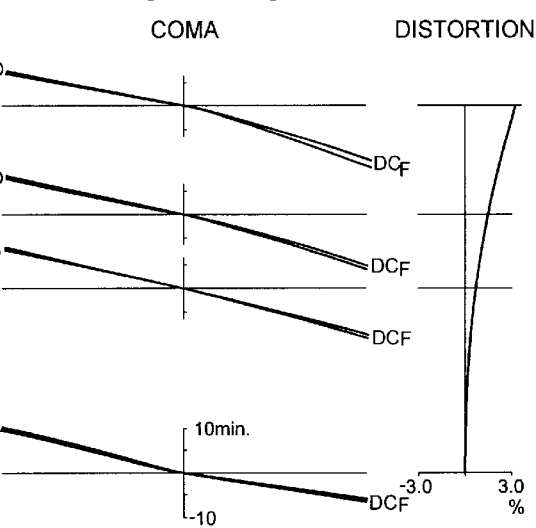
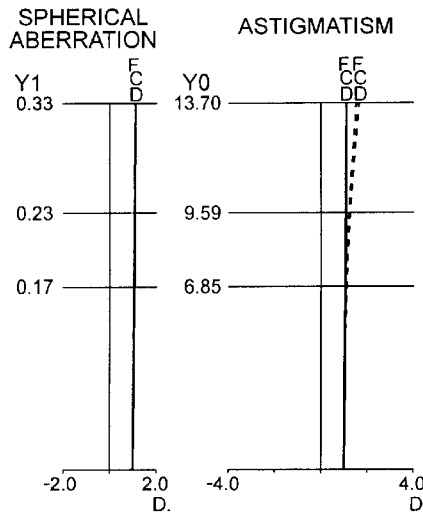
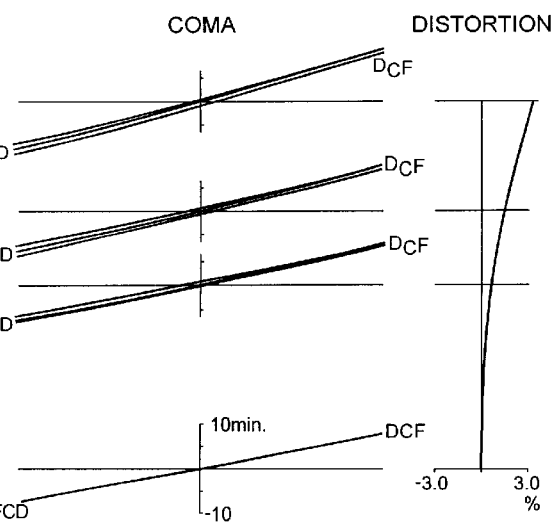

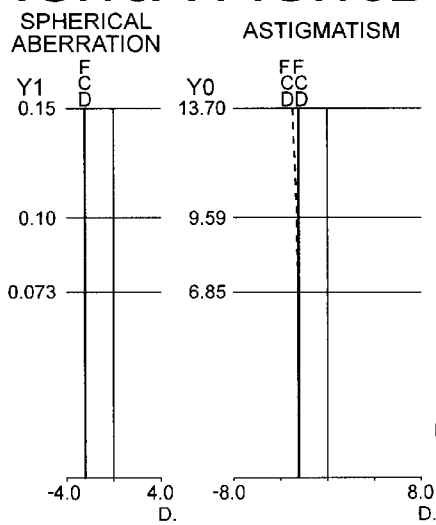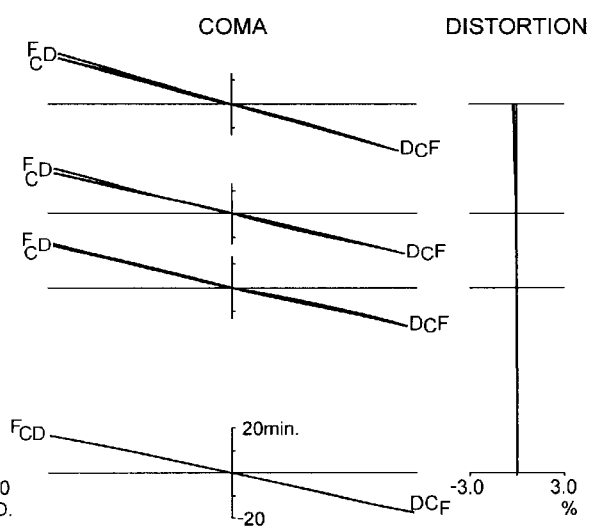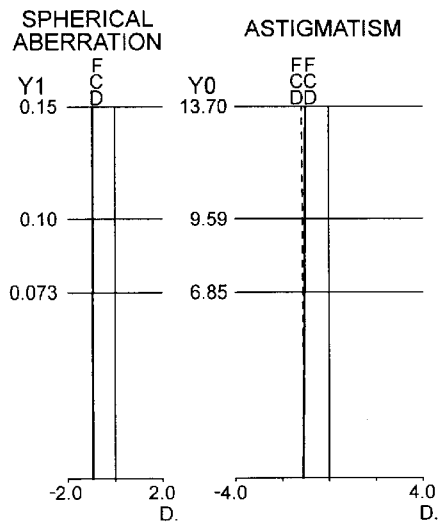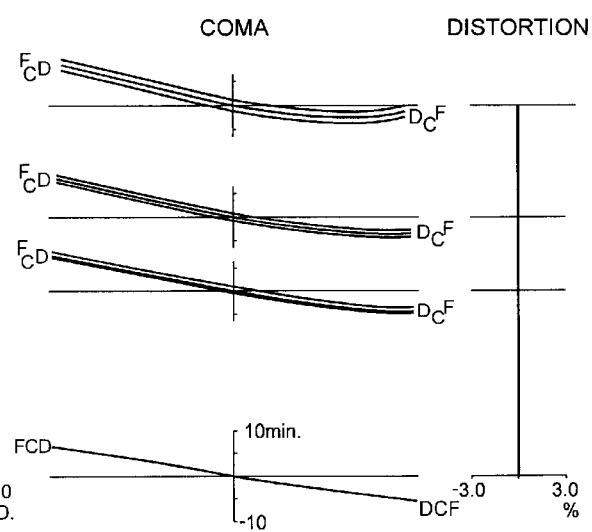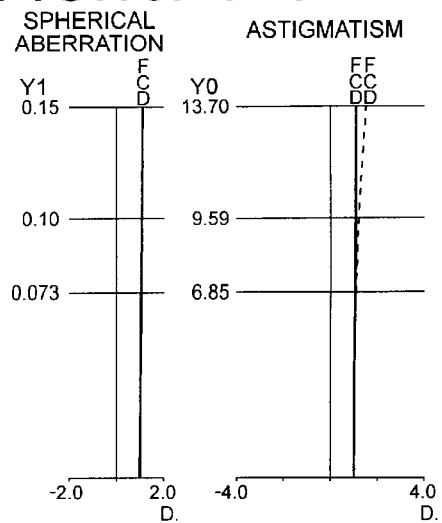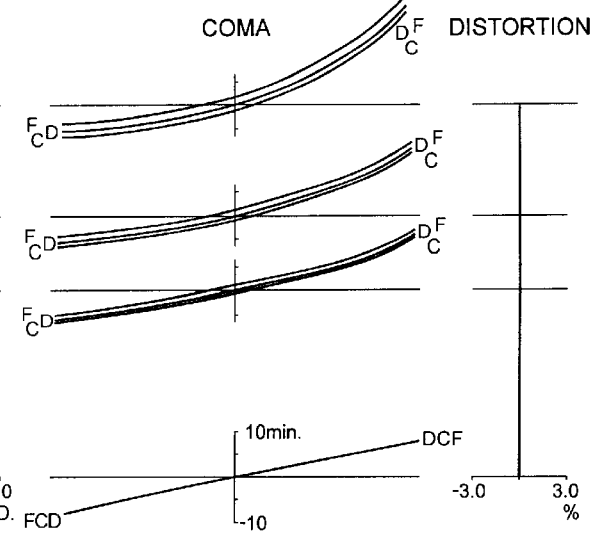

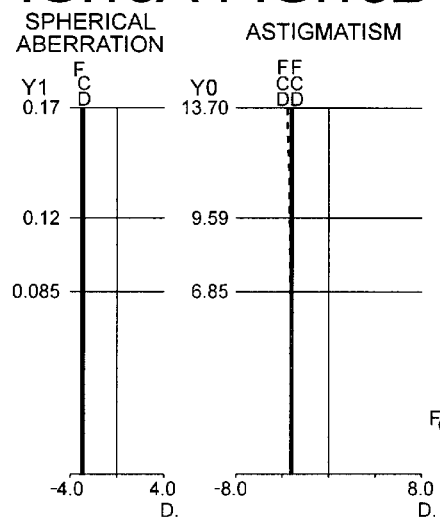
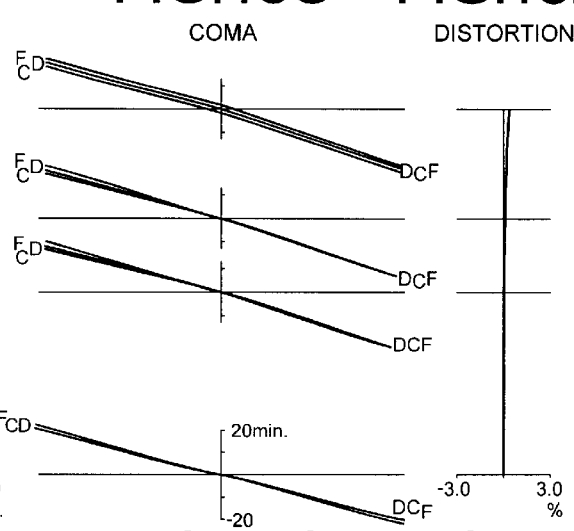
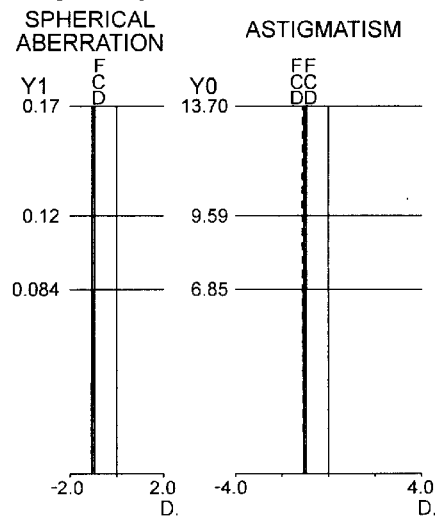
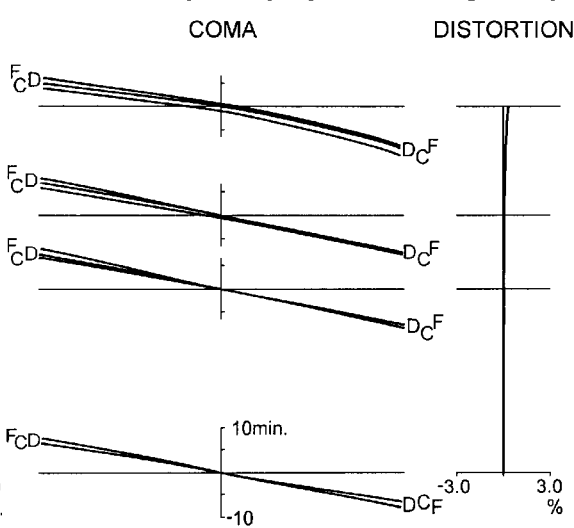
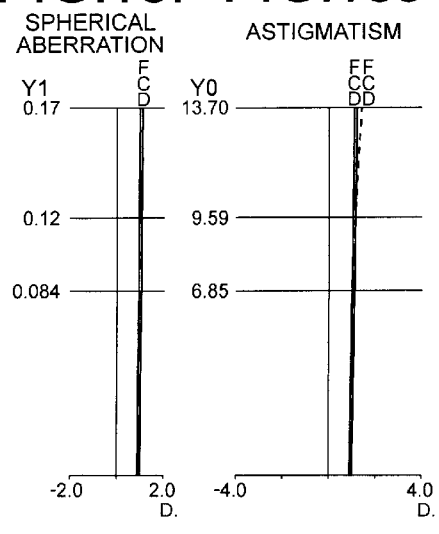
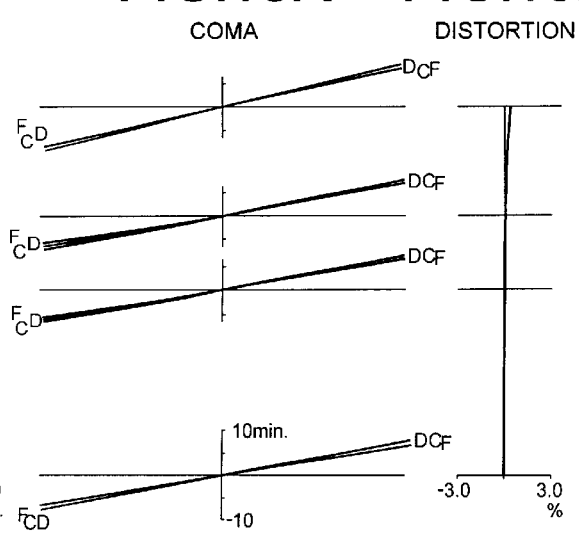

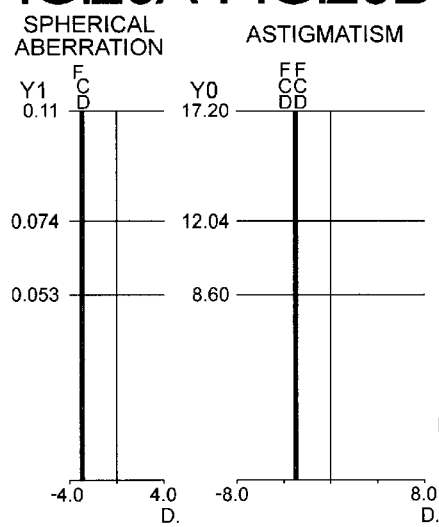
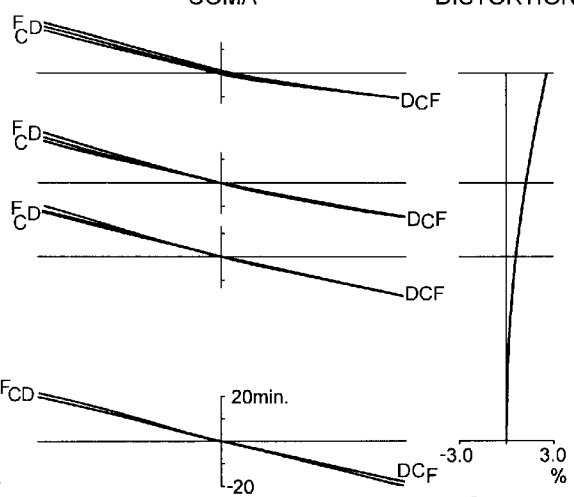
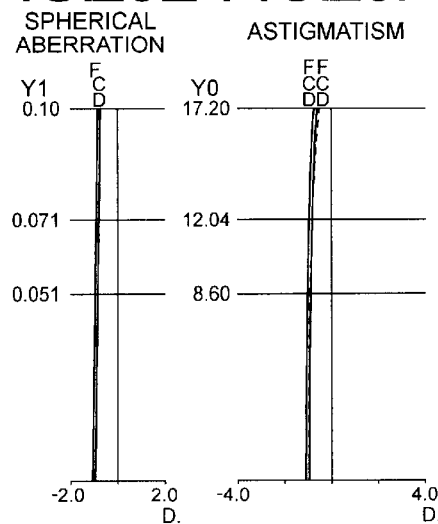
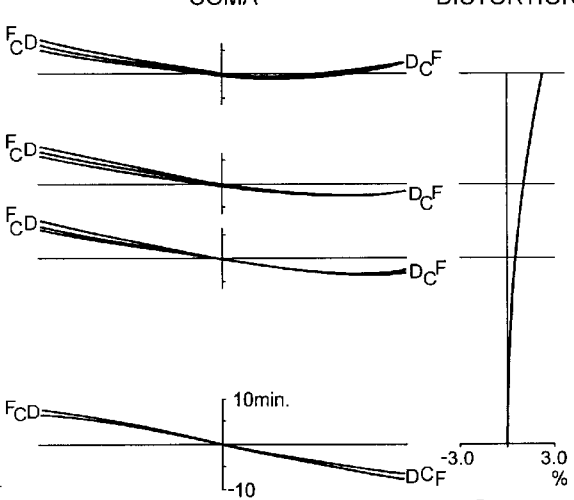
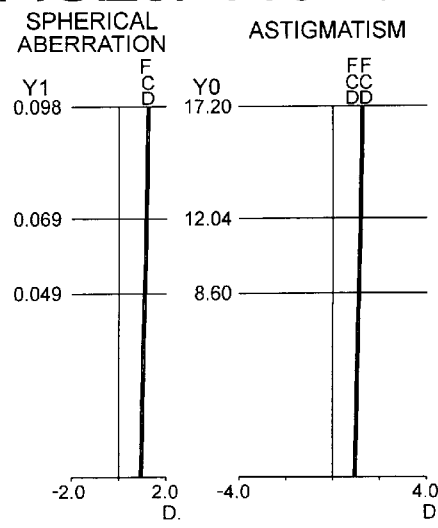
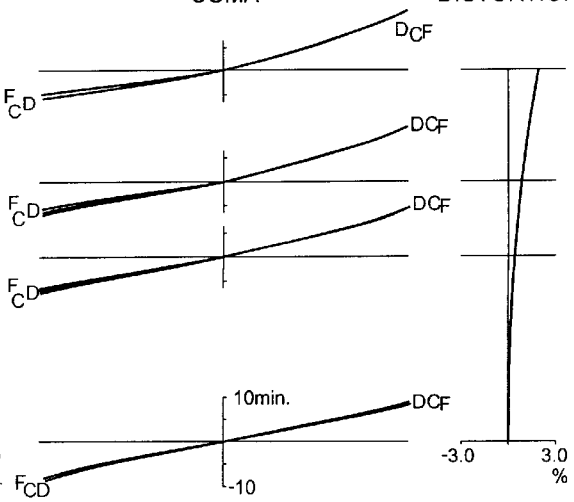

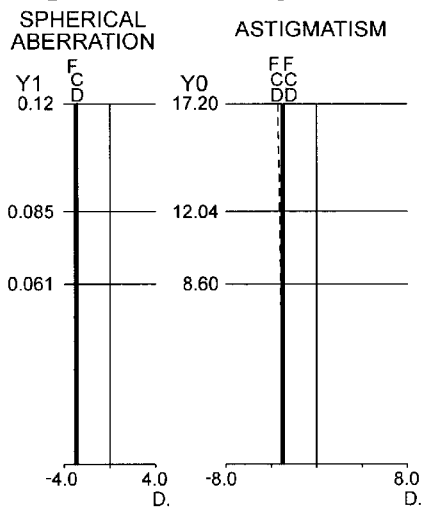
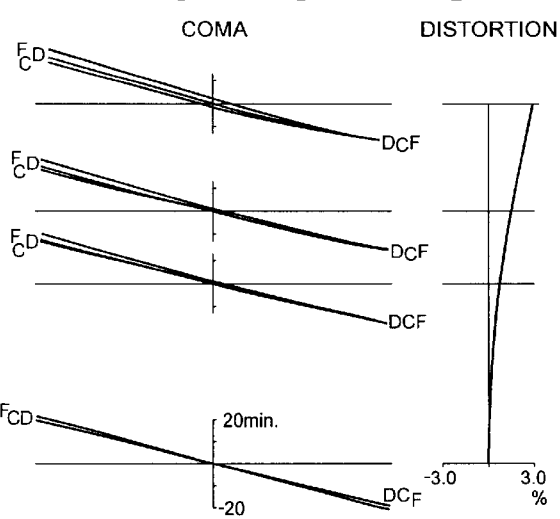
FIG.21A SPHERICAL ABERRATION
FIG.21B ASTIGMATISM
FIG.21C COMA
FIG.21D DISTORTION
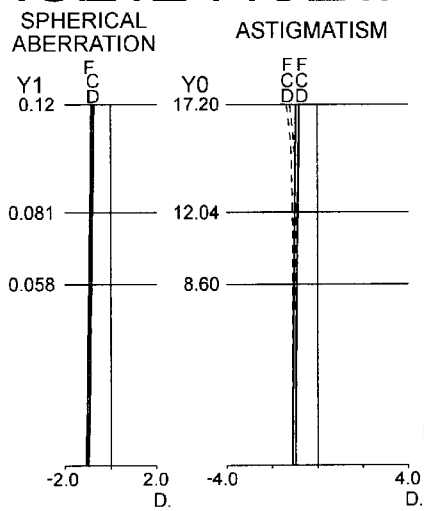
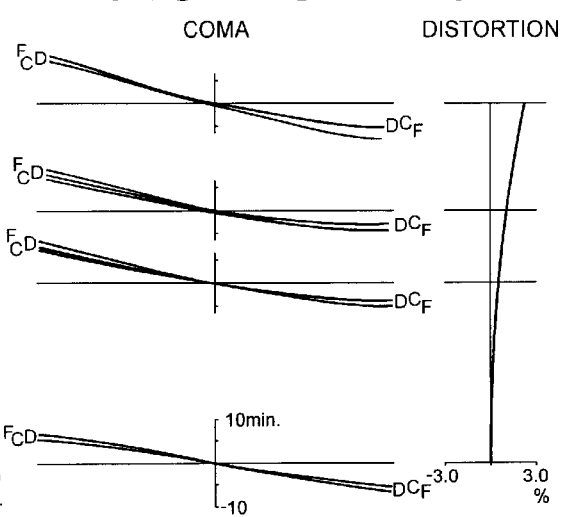
FIG.21E SPHERICAL ABERRATION
FIG.21F ASTIGMATISM
FIG.21G COMA
FIG.21H DISTORTION
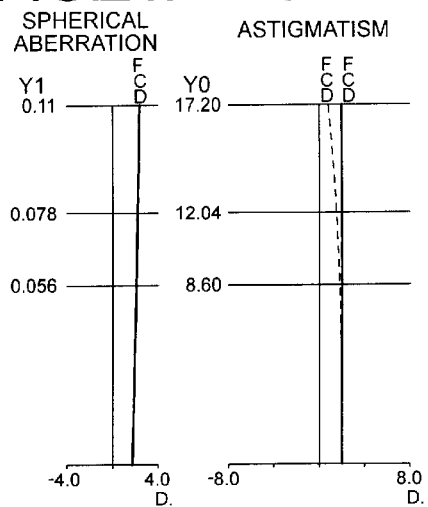
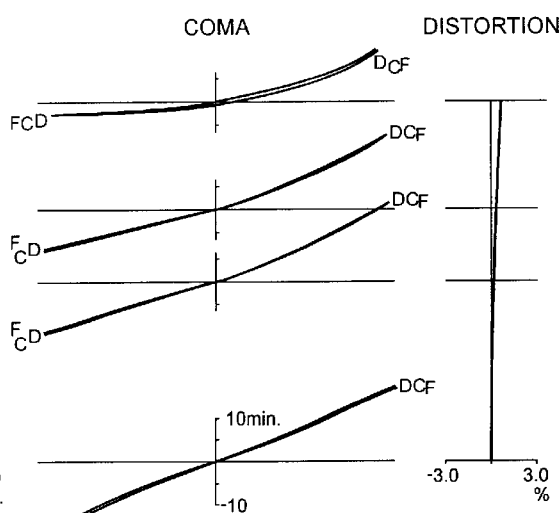
FIG.21I SPHERICAL ABERRATION
FIG.21J ASTIGMATISM
FIG.21K COMA
FIG.21L DISTORTION

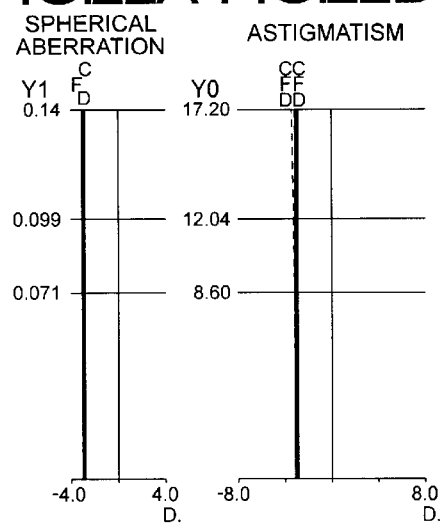
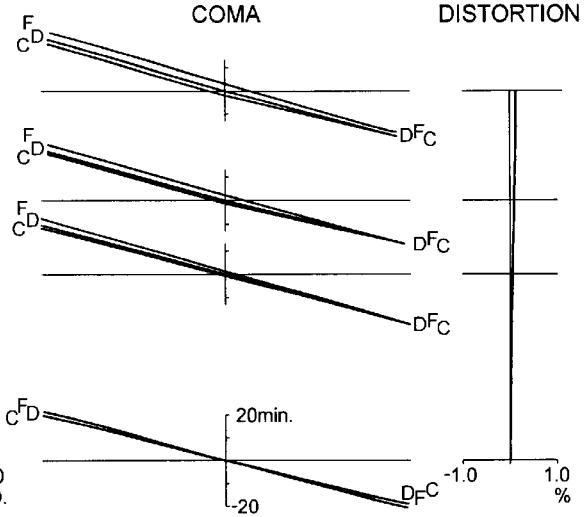
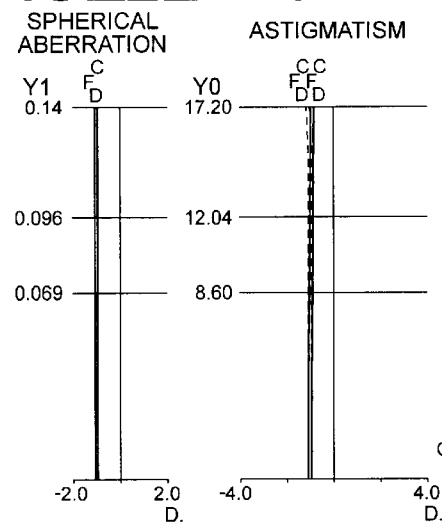
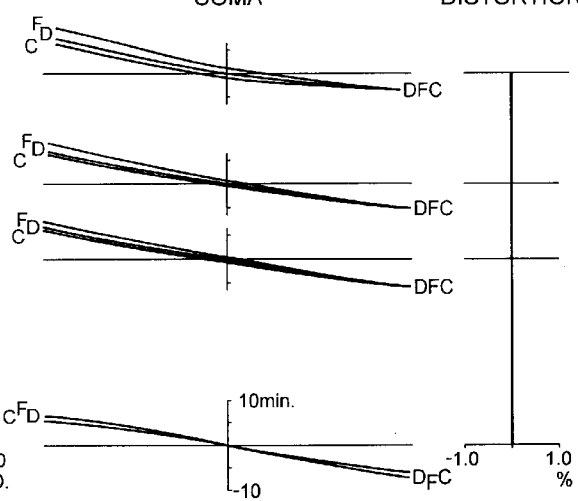
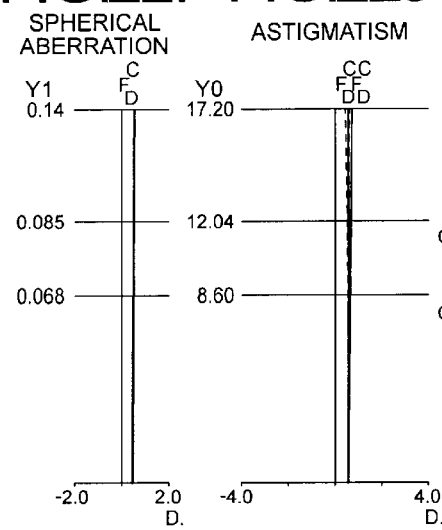
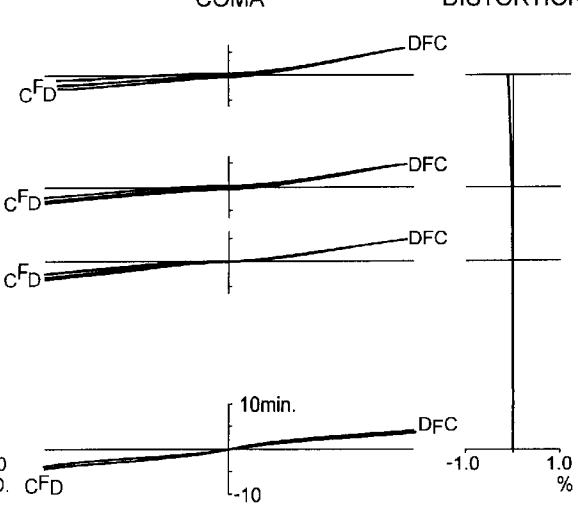

EYEPIECE LENS

This application claims the benefit of Japanese Patent applications Nos. 2000-269193, 2000-270687 and 2001-252345 which are hereby incorporated by reference.

BACKGROUND OF THE INVENTION

1. Field of the Invention

The present invention relates to an eyepiece lens and, more particularly, to an eyepiece lens most suitably for the use in a camera, etc.

2. Related Background Art

In an eyepiece lens for observing an image formed by an objective lens through an erect system, it is necessary to enlarge the erect system in order to obtain a higher magnification since a light beam spreads. Then, since the length of an optical path for the light beam is prolonged, the focal length of the eyepiece lens has to be increased in proportion thereto. As a result, it is impossible to achieve a higher magnification. Particularly, an eyepiece lens having a long eye relief (the distance from the eyepiece lens to the eyepoint) has this tendency conspicuously.

Moreover, as an eyepiece lens for an observing optical system of a camera, or the like, there is known a lens which is comprised of three groups including a positive lens group, a negative lens group and another positive lens group, so as to move an arbitrary lens group along the optical to correct the diopter. As such an eyepiece lens, various lenses have been proposed including one which is disclosed in Japanese Patent Post-Examination Publication No. 61-19968.

With the recent electronization of cameras, etc., various display devices such as an image pick-up device or a monitor are increasingly mounted on a camera body. As a result, the camera body has to be enlarged, and an optical finder is required to have a greater distance between the focal surface and the eyepoint correspondingly, compared with conventional ones. Also, an image formation area on an image pick-up device is made smaller than one frame of a conventional silver halide film, so that a finder magnification is also required to be greater. Further, the eyepiece lens is required to additionally have a diopter correcting function, and the like, in order to cope with the visual acuity of any photographer.

SUMMARY OF THE INVENTION

The present invention has been contrived taking the above inconveniences into consideration, and an object of the invention is to provide an eyepiece lens having an excellent aberration performance with a sufficient eye relief length and high magnification, and preferably, an eyepiece lens further having a diopter adjusting function.

In order to solve the above problems, there is provided an eyepiece lens for observing an image formed by an objective lens through an erect system, at least comprising a first lens group having a positive refracting power and a second lens group having a negative refracting power in the order from the side of an observer, and satisfying the following condition:

$$-3 < SF1 < -1 \tag{1}$$

where SF1 indicates a shape factor of the first lens group, and SF indicates a shape factor of the lens group, which is defined by:

$$SF = (Rs+RE)/(Rs-RE),$$

where Rs indicates the radius of curvature of a lens surface closest to the object side and RE indicates the radius of curvature of a lens surface closest to the observer side.

According to the present invention, with the above structure, it is possible to move the principal point of the entire eyepiece lens to the observer side, and to prevent a prolongation of the focal length of the eyepiece lens which may be caused by the prolongation of the optical path length of the erect system, thereby raising the magnification. It is also possible to secure a sufficient eye relief length since this eyepiece lens has a retro-focus type layout which has positive and negative refracting powers when seen from the object side toward the observer side.

Also according to the present invention, it is preferable to satisfy the following condition:

$$-3 < SF1 < -1 \tag{1}$$

Above the upper limit of the condition (1), the lens is not preferable for improving the finder magnification. On the contrary, below the lower limit of the condition (1), it is difficult to correct a distortion and a coma. This case is not preferable also in terms of manufacturing since a fluctuation in aberration becomes great due to an error such as eccentricity. Accordingly, it is practically desirable to satisfy the condition (1) that $-3 < SF1 < -1$ In this case, the layout of the second lens group and the first lens group is of a retro-focal type having the negative and positive refracting powers when seen from the object side to the observer side, so that a sufficient length for the eye relief can be secured.

According to the present invention, it is referable to adjust the diopter by moving the first lens group having the positive refracting power or a lens component having a positive refracting power in the first lens group, along the optical axis. In this manner, it is possible to adjust the diopter while maintaining a corrected aberration state, and particularly, excellent distortion. It is also possible to adjust the diopter by moving a lens component having a negative refracting power in the second lens group along the optical axis. In this case, a lens closer to the focal surface has a greater fluctuation in aberration when the diopter is changed. As a result, it is preferable to adjust the diopter by moving a lens component which is positioned on the observer side, in the second lens group.

Also, according to the present invention, it is preferable to satisfy, in addition to the above condition (1), the following condition (2):

$$1 < SF2 < 6 \tag{2}$$

where SF2 indicates the shape factor of the second lens group.

If the condition (2) is satisfied and the second lens group is formed in a meniscus shape concave on the observer side, an excellent aberration state can be securely obtained. Also, since the principal point of the entire eyepiece lens is moved to the image formation surface side, a high magnification can be achieved. Below the lower limit of the condition (2), an astigmatism or a coma which is generated in the first lens group satisfying the condition (1) can not be sufficiently corrected. On the contrary, above the upper limit of the condition (2), it is difficult to correct a distortion. As a result, it is preferable to satisfy the condition (2) that $1 < SF2 < 6$.

Further, according to the present invention, in addition to satisfy the condition (1), it is preferable to constitute the second lens group having the negative refracting power with a lens group having a negative refracting power and a lens group having a positive refracting power in this order from the observer side. Then, it is possible to conduct excellent aberration correction while maintaining a wide distance between the lens group having the positive refracting power and the lens group having the negative refracting power in the second lens group. It is also possible to maintain a long distance from the focal surface to the eyepoint to cope with enlargement of a camera size while aiming cost reduction of the glass material.

It is also preferable to satisfy the following condition (3):

$$-2 < SF2p < -1 \qquad (3)$$

where SF2p indicates the shape factor of the positive lens in the second lens group. When the positive lens group in the second lens group is formed into a meniscus form which is concave on the observer side, the principal point of the entire eyepiece lens is moved to the imaging surface side. By the use of this phenomenon, the focal length of the entire eyepiece lens can be reduced to thereby raise the magnification. Above the upper limit of the condition (3), it is difficult to improve the finder magnification. On the contrary, below the lower limit of the condition (3), it is difficult to correct a distortion and a coma. Accordingly, it is preferable to satisfy the condition (3) that $-2 < SF2p < -1$.

Also, according to the present invention, it is preferable to satisfy the following condition (5):

$$Dx/fe \geq 0.08 \qquad (5)$$

where Dx indicates the thickness of a lens group, and fe indicates the focal length of the eyepiece lens when the dopier is −1, respectively.

If the condition (5) is satisfied, an excellent aberration state can be obtained. Below the lower limit of the condition (5), a coma can not be sufficiently corrected.

The unit of diopter is expressed in "dpt" in the following description. The diopter X [dpt] indicates a state in which an image obtained by the eyepiece lens can be formed at a position of 1/X [m] on the optical axis from the eyepoint (the sign is negative when the image is formed closer to the object than the eyepoint).

By satisfying such condition, it is possible to increase the distance between the erect system and the eyepoint by making at least one of the lens groups to be thicker to prolong the optical path length while enhancing the magnification.

Particularly, as to the first lens group having the positive refracting power, if the concave surface on the observer side is moved backward to make the lens group thicker, the distance between the erect system and the eyepoint can be wider. In addition, the convex surface on the image formation surface side which has a strong refracting power because of the meniscus shape satisfying the condition (1) is not moved. For this reason, the focal length of the first lens group can be effectively reduced while maintaining an excellent aberration state. In the similar manner, as to the lens group having the positive refracting power in the second lens group satisfying the meniscus shape of the condition (3), it is possible to increase the distance between the erect system and eyepoint while maintaining the excellent aberration state by making the lens group thicker by retreating the concave surface on the observer side. In addition, as for the lens group having the negative refracting power, if the lens group is made thicker by moving forward the surface on the image formation surface side, the concave surface on the observer side which has a strong refracting power because of the shape satisfying the condition (2) is not moved. As a result, it is possible to increase the distance between the erect system and the eyepoint while maintaining an excellent aberration state.

Further, it is desirable to constitute at least of the first lens group satisfying the condition (1) and the second lens group satisfying the condition (2) with a single cemented lens. In this case, a longitudinal chromatic aberration and a chromatic aberration of magnification can be easily corrected if the above cemented lens is formed of glasses having different dispersions which satisfy the following condition:

$$|va-vb| > 8$$

where va and vb respectively indicate the average rates of dispersion of the glass materials for constituting the cemented lens. It is also possible to reduce the processing cost of a thick lens by constituting the cemented lens with lens components of the same glass.

In addition, if the first lens group becomes thicker, it is difficult to adjust the diopter by moving the first lens group along the optical axis. Then, according to the present invention, it is desirable to constitute the second lens group with a lens group having a negative refracting power and a lens group having a positive refracting power in this order from the observer side, and to satisfy the following condition (4):

$$0.5 < |f2n|/f1 < 1 \qquad (4)$$

where f2n indicates the focal length of the negative lens group in the second lens group, and f1 indicates the focal length of the first lens group, respectively.

By satisfying the above condition to provide the negative lens group in the second lens group with the strong refracting power and to move this lens group along the optical axis, a diopter adjusting function is additionally provided.

Above the upper limit of the condition (4), an amount of movement of the negative lens group becomes great so that the effect of adjusting the diopter by moving the negative lens in the second lens group becomes poor. On the other hand, below the lower limit of the condition (4), the refracting power of a lens which is moved for adjusting the diopter becomes great, so that a fluctuation in aberration due to a mechanical backlash becomes unfavorably great. As a result, in order to adjust the diopter by moving the negative lens in the second lens group, it is preferable to satisfy the condition (4) that $0.5 < |f2n|/fe < 1$ More preferably, the upper limit of the condition (4) should be set to 0.5 or around in order to reduce a Petzval sum.

Furthermore, according to the present invention, it is preferable to introduce a condenser lens between the imaging surface and the erect system and to satisfy the following condition (6):

$$1 < fc/fe < 3 \qquad (6)$$

where fc indicates the focal length of the condenser lens, and fe indicates the focal length of the entire eyepiece lens at −1 dpt, respectively.

In this manner, it is possible to enhance the magnification of the entire eyepiece lens by using the refracting power of the condenser lens itself while, at the same time, correcting the distortion.

Above the upper limit of the condition (6), there arises little effect for enhancing the magnification of the entire eyepiece lens. On the contrary, below the lower limit of the condition (6), it becomes difficult to correct the distortion.

Also, according to the present invention, there is provided an eyepiece lens in an eyepiece lens optical system for observing an image of an object through an erect system which comprises a first lens group having a positive refracting power, a second lens group having a negative refracting power, and a third lens group having a positive refracting power in this order from the object side, and which is characterized in that at least one lens group out of the above lens groups having the positive refracting power satisfies the following condition:

$$Dp/fe > 0.1 \tag{7}$$

where Dp indicates the thickness of the lens group having the positive refracting power, and fe indicates the focal length of the eyepiece lens when the diopter is −1 dpt.

According to the present invention, it is possible to obtain the effect that an optical path length is prolonged by making at least one of the above positive lens groups thick, so as to enhance the finder magnification, thereby enlarging the distance between the erect system and the eyepoint.

Below the lower limit of the condition (7), it is difficult to obtain the above effect. However, if the lens is made to be too thick, the weight or the cost of the cost is unfavorably increased. Accordingly, it is practically preferable that the lens group is within the condition of 0.3>Dp/fe>0.1 Particularly, when the positive lens group is formed of a single lens, it is preferable that the lens is practically within the condition of 0.2 >Dp/fe>0.1 It is also preferable if all of the positive lens groups for constituting the eyepiece lens satisfy the condition of Dp/fe >0. 1 since the effect of the present invention can be exhibited more excellently.

Also according to the present invention, it is preferable to satisfy the following condition (8):

$$Dt/fe > 0.2 \tag{8}$$

where the entire thickness of the eyepiece lens is indicated by Dt on the condition that the above condition (7) is satisfied.

It is possible to enlarge the distance between the erect system and the eyepoint by satisfying the condition (8). Below the lower limit of the condition (8), the total length of the erect system is enlarged, so that it becomes difficult to enhance the finder magnification. Also, since the eyepiece lens becomes thinner, the distance between the erect system and the eyepoint can not be enlarged, so that the object of the present invention can not be achieved. More preferably, the condition of 0. 6 >Dt/fe>0.3 should be satisfied. Above this upper limit of 0.6, the erect system becomes thin so that it is difficult to constitute the finder itself.

Also, according to the present invention, it is preferable that the positive lens group which satisfies the above condition (7) comprises a lens having a meniscus shape with the convex surface directed to the object side. With such shape, the exit pupil of the positive lens can be brought closer to the eyepoint As a result, it is possible to see an image in an enlarged manner and to enhance the finder magnification.

Also, according to the present invention, the positive meniscus shape preferably satisfies the following condition:

$$1.3 < SF < 2 \tag{9}$$

where SF indicates the same shape factor as that described above.

By satisfying the condition (9), it is possible to easily correct a coma and an astigmatism, so that an excellent aberration state can be securely obtained while maintaining high finder magnification. Above the upper limit of the condition (9), the exit pupil approaches closer to the eyepoint, which is preferable for enhancing the finder magnification. However, in this case, a fluctuation of a coma or distortion which is caused by the diopter adjustment can not be correct. On the contrary, below the lower limit of the condition (9), a chance of occurring an aberration due to the diopter adjustment is reduced. However, the exit pupil is distant from the eyepoint and it becomes difficult to enhance the finder magnification.

When all of the positive lens groups for constituting the eyepiece lens satisfy the conditions (7) and (9), the effect of the present invention is preferably enhanced. It is needless to say that the effect of the present invention can be obtained also when the conditions (7), (8) and (9) are simultaneously satisfied.

Then, it is also preferable to introduce an aspherical surface into an eyepiece lens according to the present invention. Particularly, a distortion can be improved when the aspherical surface is introduced into the positive lens group, while a fluctuation in coma in the range of diopter change can be easily reduced when the aspherical surface is introduced into the negative lens group. Further, it is effective to employ resin material for the eyepiece lens according to the present invention.

When a resin material is employed, the aspherical surface can be introduced more easily because of the lower cost thereof, whereby enabling a mass production of the eyepiece lens.

Moreover, it is preferable to constitute a positive lens for satisfying the condition (7) with a cemented lens. If glasses having different rates of dispersion are used to constitute the cemented lens, it becomes easier to correct a longitudinal chromatic aberration and a chromatic aberration of the magnification. It is also possible to reduce the processing cost by constituting the cemented lens with a single glass.

BRIEF DESCRIPTION OF THE DRAWINGS

FIGS. 6A through 6L are views for showing aberrations when the diopter in the third embodiment is on the most negative side, when the diopter is −1 dpt, and when the diopter is on the most positive side, respectively;

FIGS. 8A through 8L are views for showing aberrations when the diopter in the fourth embodiment is on the most negative side, when the diopter is −1 dpt, and when the diopter is on the most positive side, respectively;

FIGS. 10A through 10L are views for showing aberrations when the diopter in the fifth embodiment is on the most negative side, when the diopter is −1 dpt, and when the diopter is on the most positive side, respectively;

FIGS. 12A through 12L are views for showing aberrations when the diopter in the sixth embodiment is on the most negative side, when the diopter is −1 dpt, and when the diopter is on the most positive side, respectively;

FIGS. 14A through 14L are views for showing aberrations when the diopter in the seventh embodiment is on the most negative side, when the diopter is −1 dpt, and when the diopter is on the most positive side, respectively;

FIGS. 16A through 16L are views for showing aberrations when the diopter in the eighth embodiment is on the most negative side, when the diopter is −1 dpt, and when the diopter is on the most positive side, respectively;

FIGS. 18A through 18L are views for showing aberrations when the diopter in the ninth embodiment is on the most negative side, when the diopter is −1 dpt, and when the diopter is on the most positive side, respectively;

FIGS. 20A through 20L are views for showing aberrations when the diopter in the tenth embodiment is on the most negative side, when the diopter is −1 dpt, and when the diopter is on the most positive side, respectively;

FIGS. 21A through 21L are views for showing aberrations when the diopter in the eleventh embodiment is on the most negative side, when the diopter is −1 dpt, and when the diopter is on the most positive side, respectively; and FIGS. 22A through 22L are views for showing aberrations when the diopter in the twelfth embodiment is on the most negative side, when the diopter is −1 dpt, and when the diopter is on the most positive side, respectively.

DESCRIPTION OF THE PREFERRED EMBODIMENTS

Figure 1:
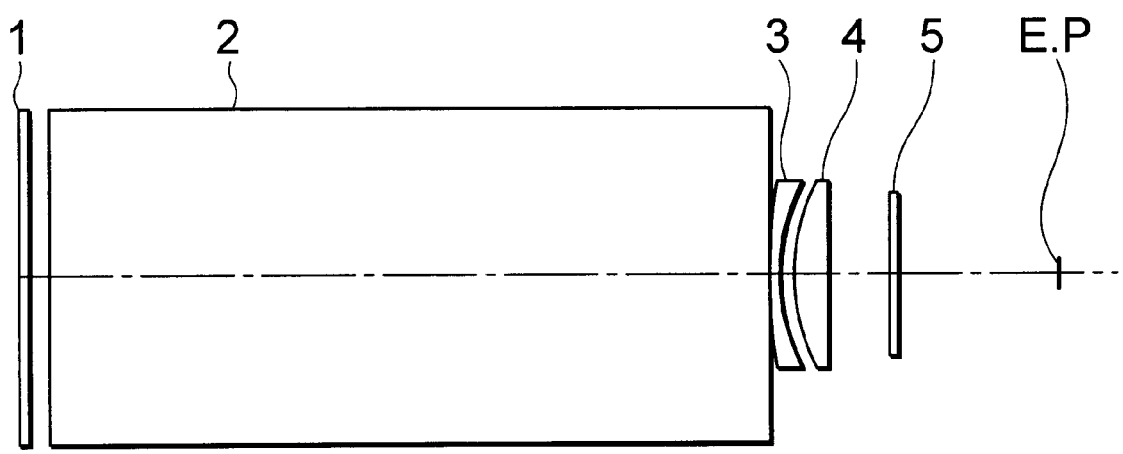
FIG. 1 is a view for showing a lens configuration of a finder optical system having an eyepiece lens according to a first embodiment of the present invention.
Figure 2:
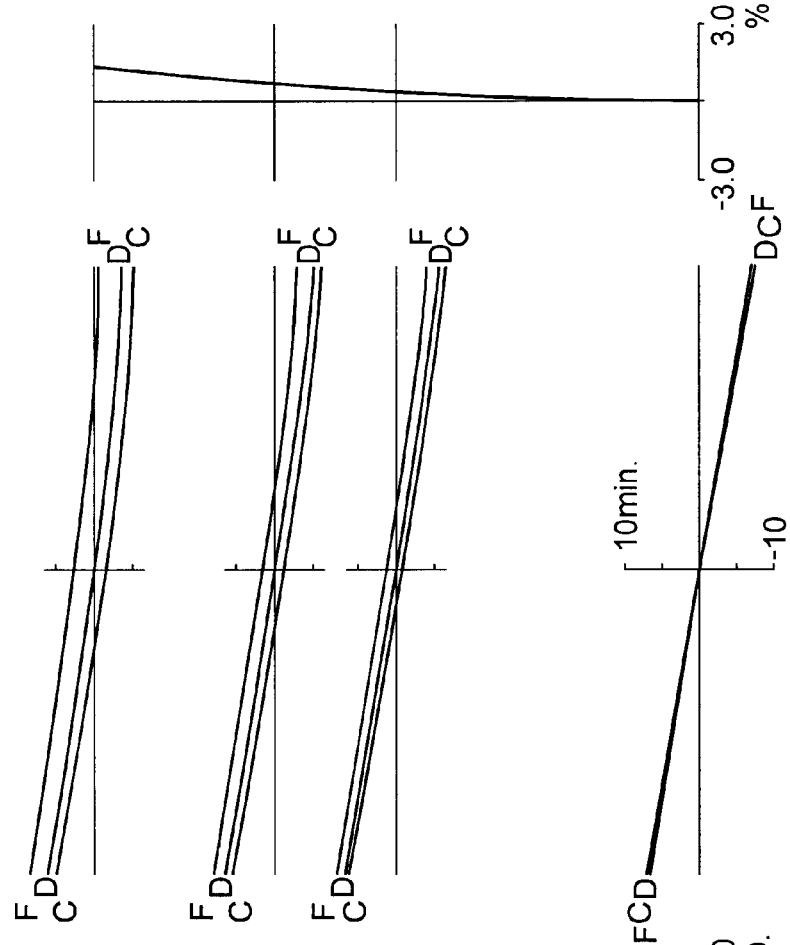
FIGS. 2A through 2D are views for showing aberrations in the first embodiment.

Preferred embodiments of the present invention will be described below with reference to the attached drawings.
First Embodiment FIG. 1 is a cross-sectional view of a finder optical system which has an eyepiece lens according to a first embodiment of the present invention and a fixed diopter of −1 dpt. The finder optical system is comprised of a focal surface 1, a block part 2 in which an erect system is developed, a second lens group 3, a first lens group 4 and a protective plate 5 in the order form the object side. The position E.P is the eyepoint. In the present embodiment, the first lens group having a positive refracting power is formed in a meniscus shape with a concave surface on the observer side, so that an excellent aberration state can be maintained in spite of a high magnification.

Table 1 shows the specifications in the first embodiment. The surface numbers are given successively in the order from the object side, and the index of refraction is for the line d (λ=587. 56 nm). In all of the following embodiments, an aspherical surface is expressed by the following numerical formula:

$$X = (Y^2/R)/[1+(1-K\cdot Y^2/R^2)^{1/2}] + C2\cdot Y^2 + C3\cdot Y^3 + C4\cdot Y^4 + \ldots,$$

where the height of the aspherical surface in a direction perpendicular to the optical axis is Y, the distance along the optical axis from a tangential surface at the vertex of the aspherical surface to the position on the aspherical surface at the height Y (sag amount) is X, the radius of curvature of the vertex is R, a conic coefficient is K, and the aspherical coefficient of the n-th order is Cn, respectively.

In the lens data, the aspherical surface has the mark * on the left shoulder thereof.

Though the focal length, the radius of curvature, the distance, and the other data on the length in the specifications are generally expressed in "mm", the unit of the data is not limited to this since the optical system can provide the same optical performance even if it is proportionally enlarged or reduced.

TABLE 1

| Surface Number | Radius of curvature | Surface distance | Index of refraction | Abbe number |
|---|---|---|---|---|
| (Lens data) | | | | |
| 1 | ∞ | 0.25 | 1.0 | |
| | (Focal surface) | | | |
| 2 | ∞ | 1.2 | 1.49108 | 57.57 |
| | (Flat surface) | | | |
| 3 | ∞ | 2.25 | 1.0 | |
| | (Flat surface) | | | |
| 4 | ∞ | 92.797 | 1.51680 | 64.10 |
| | (Flat surface) | | | |
| 5 | ∞ | 0.1 | 1.0 | |
| | (Flat surface) | | | |
| 6 | 99.428 | 1.0 | 1.80518 | 25.35 |
| 7 | 25.600 | 1.9 | 1.0 | |
| 8 | 26.440 | 4.2 | 1.80411 | 46.55 |
| 9 | 800.000 | 7.9 | 1.0 | |
| 10 | ∞ | 1.0 | 1.52216 | 58.80 |
| | (Flat surface) | | | |
| 11 | ∞ | 20.8 | 1.0 | |
| | (Flat surface) | | | |
| | E.P | | | | fe = 74.4
(Values corresponding to the conditions)

(1) SF1 = −1.068
(2) SF2 = +1.694

Figure 3:
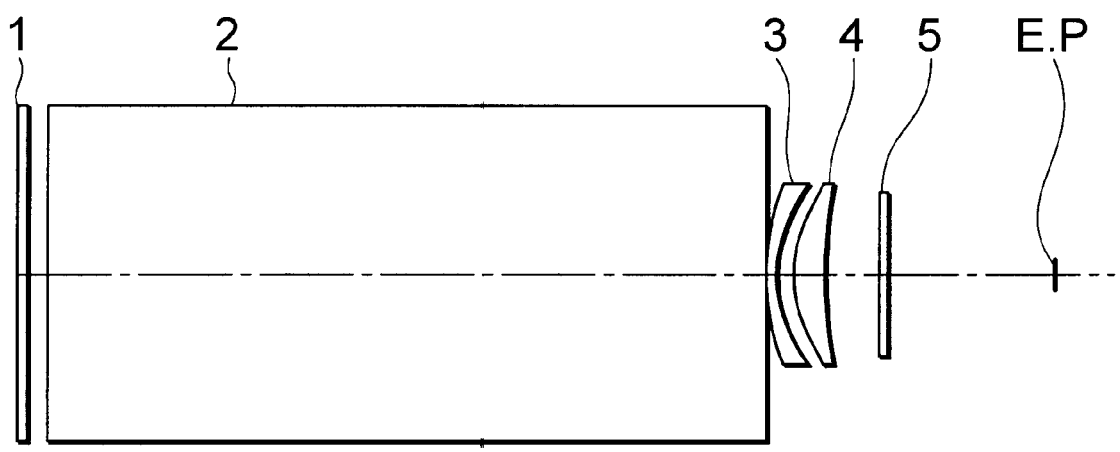
FIG. 3 is a view for showing a lens configuration of a finder optical system having an eyepiece lens according to a second embodiment of the present invention.
Figure 4:
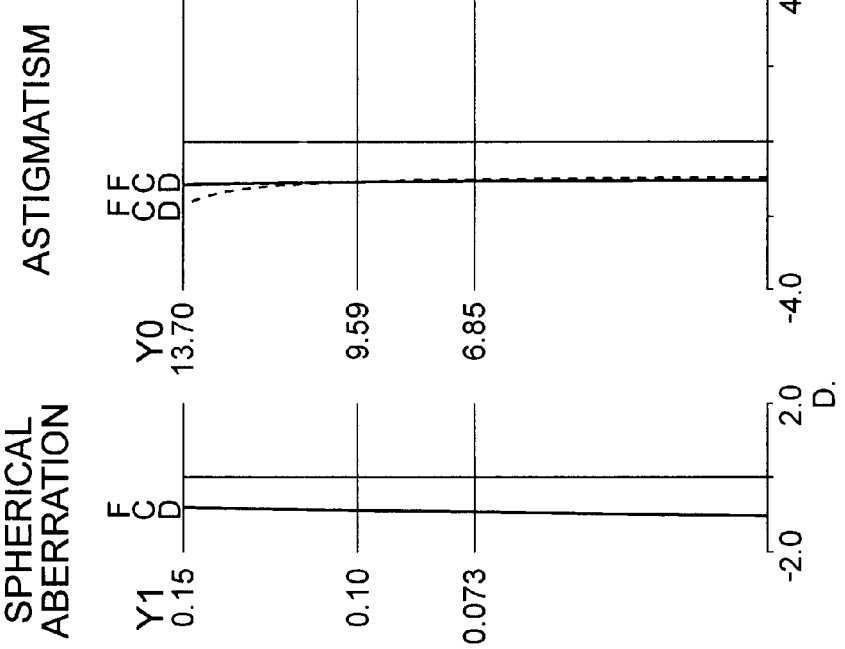
FIGS. 4A through 4D are views for showing aberrations in the second embodiment.

FIGS. 2A through 2D are views for showing the aberrations in the present embodiment (including spherical aberration, astigmatism, coma and distortion in the order from the left). In these views of the aberrations, Y1 indicates the incident height of a light beam on the erect system, and Y0 the height of the object on the focal surface, respectively. The unit "D." along the horizontal axis for the spherical aberration and the astigmatism indicates the diopter (dpt), and "min" for the coma indicates a minute of the angular unit. C, F, and D in the views indicate the aberration curves on the line C (λ=656.28 nm), the line F (λ=486.13 nm), and the line d (λ-=587.56 nm), respectively. In the following description, the same referential symbols as those in the present embodiment are used in the aberration views for all of the embodiments. As clearly seen from the aberration views, the aberrations are excellently corrected.
Second Embodiment FIG. 3 is a view for showing a cross section of a finder optical system which has an eyepiece lens according to a second embodiment of the present invention and a fixed diopter of −1 dpt. The finder optical system is comprised of a focal surface 1, a block part 2 in which an erect system is developed, a second lens group 3, a first lens group 4 and a protective plate 5 in the order form the object side.

The position E.P is the eyepoint. In the present embodiment, the form of the first lens group is changed more than that in the first embodiment, so as to achieve a high magnification while maintaining an excellent aberration state.

Table 2 shows the specifications in the second embodiment.

TABLE 2

| Surface Number | Radius of curvature | Surface distance | Index of refraction | Abbe number |
|---|---|---|---|---|
| (Lens data) | | | | |
| 1 | ∞ (Focal surface) | 0.25 | 1.0 | |
| 2 | ∞ (Flat surface) | 1.2 | 1.49108 | 57.57 |
| 3 | ∞ (Flat surface) | 2.25 | 1.0 | |
| 4 | ∞ (Flat surface) | 92.797 | 1.51680 | 64.10 |
| 5 | ∞ (Flat surface) | 0.1 | 1.0 | |
| 6 | 17.465 | 1.0 | 1.80518 | 25.35 |
| 7 | 11.918 | 3.4 | 1.0 | |
| 8 | 13.739 | 4.7 | 1.80411 | 46.55 |
| 9 | 27.675 | 6.8 | 1.0 | |
| 10 | ∞ (Flat surface) | 1.0 | 1.52216 | 58.80 |
| 11 | ∞ (Flat surface) | 20.8 | 1.0 | |
| | E.P | | | | fe = 71.0
(Values corresponding to the conditions)

(1) SF1 = −2.972
(2) SF2 = +5.297

FIGS. 4A through 4D are views for showing the aberrations in the present embodiment. As clearly seen from the views, i the aberrations are excellently corrected.

Third Embodiment

Figure 5:
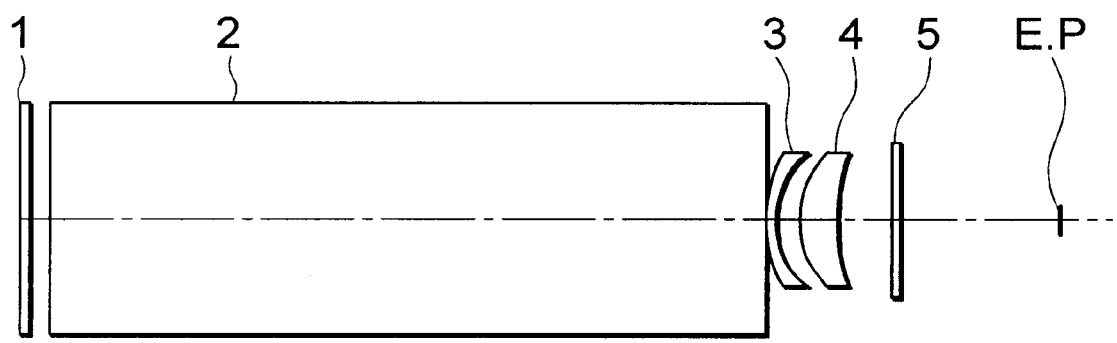
FIG. 5 is a view for showing a lens configuration of a finder optical system having an eyepiece lens according to a third embodiment of the present invention.

FIG. 5 is a view for showing a cross section of a finder optical system which has an eyepiece lens according to a third embodiment of the present invention and a fixed diopter of −1 dpt. The finder optical system is comprised of a focal surface 1, a block part 2 in which an erect system is developed, a second lens group 3, a first lens group 4 and a protective plate 5 in the order form the object side. The position E.P is the eyepoint. In the present embodiment, by moving the first lens group along the optical axis, the focal length of the whole eyepiece lens is changed to additionally obtain a diopter adjusting function.

Table 3 shows the specifications in the third embodiment.

TABLE 3

| Surface Number | Radius of curvature | Surface distance | Index of refraction | Abbe number |
|---|---|---|---|---|
| (Lens data) | | | | |
| 1 | ∞ (Focal surface) | 0.25 | 1.0 | |
| 2 | ∞ (Flat surface) | 1.2 | 1.49108 | 57.57 |
| 3 | ∞ (Flat surface) | 2.25 | 1.0 | |
| 4 | ∞ (Flat surface) | 92.797 | 1.51680 | 64.10 |
| 5 | ∞ (Flat surface) | 0.1 | 1.0 | |
| 6 | 27.924 | 1.0 | 1.80518 | 25.35 |

TABLE 3-continued

| Surface Number | Radius of curvature | Surface distance | Index of refraction | Abbe number |
|---|---|---|---|---|
| 7 | 16.875 | D1 | 1.0 | |
| 8 | 18.224 | 3.9 | 1.8 0411 | 46.55 |
| 9 | 57.551 | D2 | 1.0 | |
| 10 | ∞ (Flat surface) | 1.0 | 1.52216 | 58.80 |
| 11 | ∞ (Flat surface) | D3 | 1.0 | |
| | E.P | | | |

(Variable distance data)

| Diopter | −2.5 | −1.0 | +1.0 |
|---|---|---|---|
| D1 | 1.0 | 2.5 | 4.5 |
| D2 | 8.3 | 6.8 | 4.8 |
| D3 | 20.7 | 20.8 | 20.8 |
| fe | 77.6 | 72.8 | 67.2 |

(Values corresponding to the conditions)

(1) SF1 = −1.927
(2) SF2 = +4.055

FIGS. 6A through 6D, FIGS. 6E through 6H, and FIGS. 6I through 6L are views for showing aberrations, respectively, when the diopter is on the most negative side, when the diopter is −1 dpt, and when the diopter is on the most positive side. As clearly seen from the views, the aberrations are excellently corrected.

Fourth Embodiment

Figure 7:
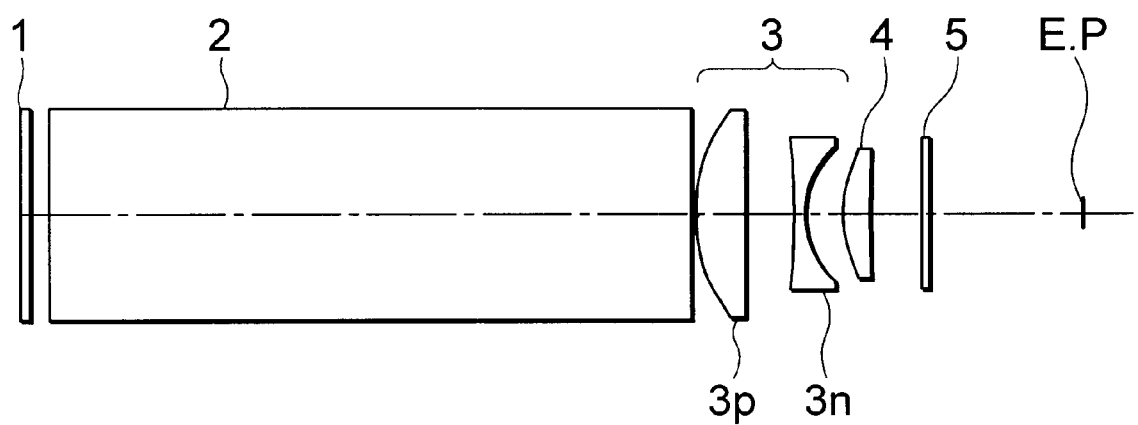
FIG. 7 is a view for showing a lens configuration of a finder optical system having an eyepiece lens according to a fourth embodiment of the present invention.

FIG. 7 is a view for showing a cross section of a finder optical system which has an eyepiece lens according to a fourth embodiment of the present invention and a fixed diopter of −1 dpt. The finder optical system is comprised of a focal surface 1, a block part 2 in which an erect system is developed, a second lens group 3, a first lens group 4 and a protective plate 5 in the order form the side opposite to the observer side. Then, the second lens group 3 is further comprised of a positive lens group 3p and a negative lens group 3n. The position E.P is the eyepoint.

In the present embodiment, the second lens group 3 is comprised of the lens group 3p having a positive refracting power and the lens group 3n having a negative refracting power, and a distance between the focal surface and the eye point is maintained to be wide. Also, a resin material is used for forming the lens group 3n having the negative refracting power in the second lens group 3 and the surface thereof is formed to be aspherical, so as to correct a coma. Further, by moving the first lens group 4 along the optical axis, the focal length of the entire eyepiece lens is changed to change the diopter.

Table 4 shows the specifications in the fourth embodiment.

TABLE 4

| Surface Number | Radius of curvature | Surface distance | Index of refraction | Abbe number |
|---|---|---|---|---|
| (Lens data) | | | | |
| 1 | ∞ (Focal surface) | 0.25 | 1.0 | |
| 2 | ∞ (Flat surface) | 1.2 | 1.49108 | 57.57 |
| 3 | ∞ (Flat surface) | 2.25 | 1.0 | |
| 4 | ∞ (Flat surface) | 86.518 | 1.51680 | 64.10 |

TABLE 4-continued

| | | | | |
|---|---|---|---|---|
| 5 | ∞ | 0.5 | 1.0 | |
| | (Flat surface) | | | |
| 6 | 22.856 | 6.9 | 1.71300 | 53.93 |
| 7 | 800.000 | 6.5 | 1.0 | |
| 8 | −102.597 | 1.5 | 1.58300 | 29.90 |
| *9 | 12.959 | D1 | 1.0 | |
| 10 | 21.022 | 3.5 | 1.71300 | 53.93 |
| 11 | 120.000 | D2 | 1.0 | |
| 12 | ∞ | 1.0 | 1.52216 | 58.80 |
| | (Flat surface) | | | |
| 13 | ∞ | D3 | 1.0 | |
| | (Flat surface) | | | |
| | | E.P | | |

(Aspherical data)

| Surface number | K | C3 |
|---|---|---|
| *9 | 1.0 | −6.158 × 10⁻⁸ |

(Variable distance data)

| Diopter | −3.0 | −1.0 | +1.0 |
|---|---|---|---|
| D1 | 2.5 | 5.0 | 7.5 |
| D2 | 9.5 | 7.0 | 4.5 |
| D3 | 17.5 | 19.9 | 22.2 |
| fe | 62.8 | 62.1 | 61.3 |

(Values corresponding to the conditions)

(1) SF1 = −1.425
(3) SF2p = 1.059
(5) Dx/fe = 0.240

FIGS. 8A through 8D, FIGS. 8E through 8H, and FIGS. 8I through 8L are views for showing aberrations, respectively, when the diopter is on the most negative side, when the diopter is −1 dpt, and when the diopter is on the most positive side. As clearly seen from the views, the aberrations are excellently corrected.

Fifth Embodiment

Figure 9:
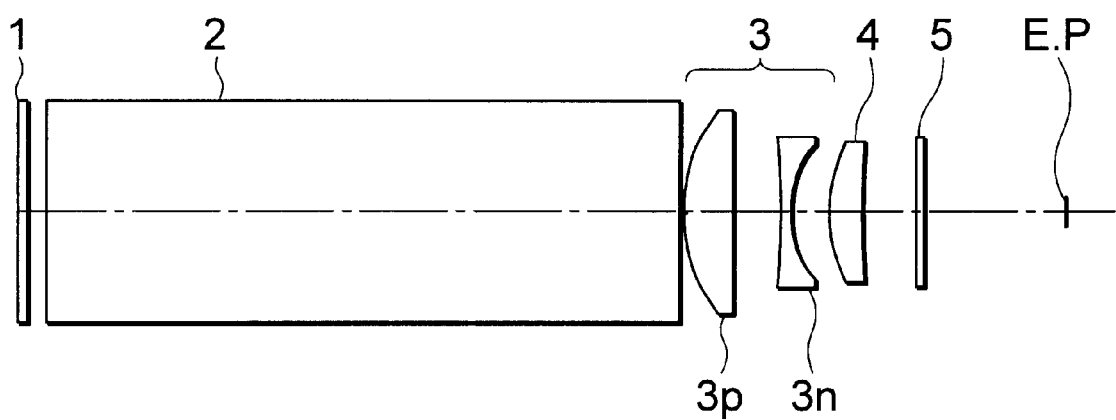
FIG. 9 is a view for showing a lens configuration of a finder optical system having an eyepiece lens according to a fifth embodiment of the present invention.

FIG. 9 is a view for showing a cross section of a finder optical system which has an eyepiece lens according to a fifth embodiment of the present invention and a fixed diopter of −1 dpt. The finder optical system is comprised of a focal surface 1, a block part 2 in which an erect system is developed, a second lens group 3, a first lens group 4 and a protective plate 5 in the order form the object side. Then, the second lens group 3 is further comprised of a positive lens group 3p and a negative lens group 3n. The position E.P is the eyepoint.

In the present embodiment, the first lens group of the above fourth embodiment is thickened to enhance the magnification. The distance from the focal surface to the eyepoint is formed to be wider while an excellent aberration state is maintained, thereby aiming a higher magnification. Further, by moving the first lens group 4 along the optical axis, the focal length of the entire eyepiece lens is changed to change the diopter.

Table 5 shows the specifications in the fifth embodiment.

TABLE 5

| Surface Number | Radius of curvature | Surface distance | Index of refraction | Abbe number |
|---|---|---|---|---|
| (Lens data) | | | | |
| 1 | ∞ | 0.25 | 1.0 | |
| | (Focal surface) | | | |
| 2 | ∞ | 1.2 | 1.49108 | 57.57 |
| | (Flat surface) | | | |
| 3 | ∞ | 2.25 | 1.0 | |
| | (Flat surface) | | | |
| 4 | ∞ | 86.518 | 1.51680 | 64.10 |
| | (Flat surface) | | | |
| 5 | ∞ | 0.5 | 1.0 | |
| | (Flat surface) | | | |
| 6 | 22.856 | 6.9 | 1.71300 | 53.93 |
| 7 | 800.000 | 6.5 | 1.0 | |
| 8 | −81.979 | 1.5 | 1.58300 | 29.90 |
| *9 | 13.400 | D1 | 1.0 | |
| 10 | 21.022 | 5.0 | 1.71300 | 53.93 |
| 11 | 120.000 | D2 | 1.0 | |
| 12 | ∞ | 1.0 | 1.52216 | 58.80 |
| | (Flat surface) | | | |
| 13 | ∞ | D3 | 1.0 | |
| | (Flat surface) | | | |
| | | E.P | | |

(Aspherical data)

| Surface number | K | C3 |
|---|---|---|
| *9 | 1.0 | −5.500 × 10⁻⁸ |

(Variable distance data)

| Diopter | −3.0 | −1.0 | +1.0 |
|---|---|---|---|
| D1 | 2.5 | 5.0 | 7.4 |
| D2 | 9.5 | 7.0 | 4.6 |
| D3 | 18.0 | 20.0 | 21.9 |
| fe | 62.5 | 61.7 | 61.0 |

(Values corresponding to the conditions)

(1) SF1 = −1.425
(3) SF2p = −1.059
(5) Dx/fe = 0.081

FIGS. 10A through 10D, FIGS. 10E through 10H, and FIGS. 10I through 10L are views for showing aberrations, respectively, when the diopter is on the most negative side, when the diopter is −1 dpt, and when the diopter is on the most positive side. As clearly seen from the aberration views, the aberrations are excellently corrected over a wide range of the diopter.

Sixth Embodiment

Figure 11:
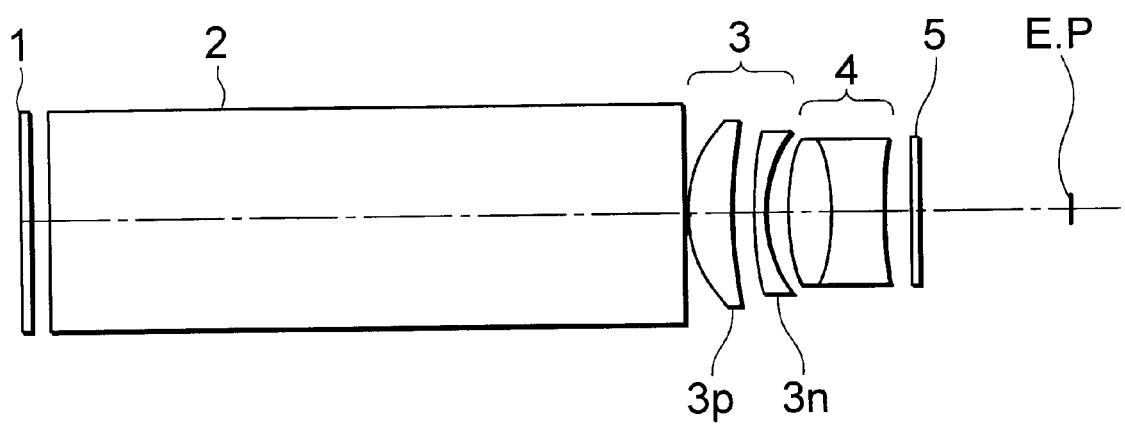
FIG. 11 is a view for showing a lens configuration of a finder optical system having an eyepiece lens according to a sixth embodiment of the present invention.

FIG. 11 is a view for showing a cross section of a finder optical system which has an eyepiece lens according to a sixth embodiment of the present invention and a fixed diopter of −1 dpt. The finder optical system is comprised of a focal surface 1, a block part 2 in which an erect system is developed, a second lens group 3, a first lens group 4 and a protective plate 5 in the order form the object side. Then, the second lens group 3 is further comprised of a positive lens group 3p and a negative lens group 3n. The position E.P is the eyepoint.

In the present embodiment, in order to make the first lens thicker, the first lens is formed of a cemented lens. By moving the negative lens in the second lens group, instead of the thickened first lens, along the optical axis, the focal length of the entire eyepiece lens is changed so as to additionally obtain a diopter adjustment mechanism. Also, a resin material is used to form the lens group having a positive refracting power in the second lens group, and an aspherical surface is introduced as a surface thereof, so as to change a distortion.

Table 6 shows the specifications in the sixth embodiment.

TABLE 6

| Surface Number | Radius of curvature | Surface distance | Index of refraction | Abbe number |
|---|---|---|---|---|
| (Lens data) | | | | |
| 1 | ∞ (Focal surface) | 0.25 | 1.0 | |
| 2 | ∞ (Flat surface) | 1.2 | 1.49108 | 57.57 |
| 3 | ∞ (Flat surface) | 2.25 | 1.0 | |
| 4 | ∞ (Flat surface) | 86.518 | 1.51680 | 64.10 |
| 5 | ∞ (Flat surface) | 0.5 | 1.0 | |
| *6 | 17.632 | 6.0 | 1.49108 | 57.57 |
| 7 | 60.000 | D1 | 1.0 | |
| 8 | 68.000 | 1.0 | 1.80518 | 25.35 |
| 9 | 16.285 | D2 | 1.0 | |
| 10 | 21.600 | 6.1 | 1.79631 | 32.16 |
| 11 | −32.099 | 7.5 | 1.72000 | 40.07 |
| 12 | 67.327 | 3.5 | 1.0 | |
| 13 | ∞ (Flat surface) | 1.0 | 1.52216 | 58.80 |
| 14 | ∞ (Flat surface) | D3 | 1.0 | |
| | E.P | | | |
| (Aspherical data) | | | | |

| Surface number | K | C2 | C4 |
|---|---|---|---|
| *6 | 1.0 | $-8.000 \times 10^{-5}$ | $-1.000 \times 10^{-10}$ |

(Variable distance data)

| Diopter | −2.8 | −1.0 | +1.0 |
|---|---|---|---|
| D1 | 4.9 | 3.3 | 1.2 |
| D2 | 1.7 | 3.3 | 5.4 |
| D3 | 18.2 | 20.0 | 20.1 |
| fe | 63.2 | 62.2 | 60.3 |

(Values corresponding to the conditions)

(1) SF1 = −1.945
(2) SF2P = −1.832
(4) |f2n|/f1 = 0.84
(5) Dx/fe = 0.22
|ν10−ν11| = 7.91

FIGS. 12A through 12D, FIGS. 12E through 12H, and FIGS. 12I through 12L are views for showing aberrations, respectively, when the diopter is on the most negative side, when the diopter is −1 dpt, and when the diopter is on the most positive side. As clearly seen from the aberration views, the aberrations are excellently corrected over a wide range of the diopter.

Seventh Embodiment

Figure 13:
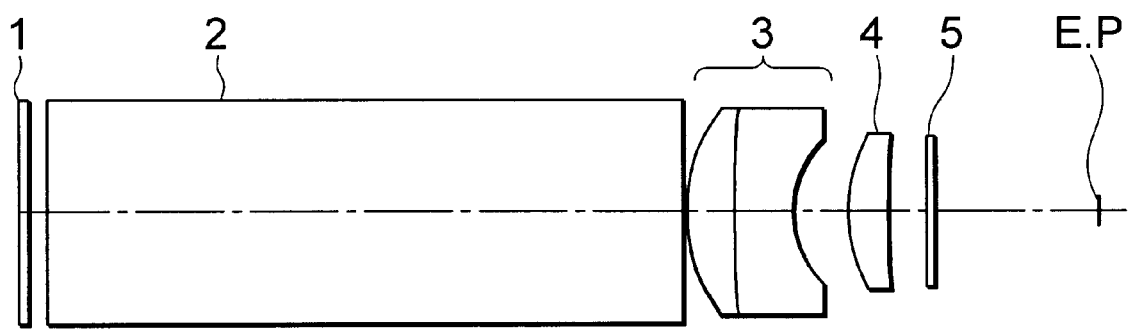
FIG. 13 is a view for showing a lens configuration of a finder optical system having an eyepiece lens according to a seventh embodiment of the present invention.

FIG. 13 is a view for showing a cross section of a finder optical system which has an eyepiece lens according to a seventh embodiment of the present invention and a fixed diopter of −1 dpt. The finder optical system is comprised of a focal surface 1, a block part 2 in which an erect system is developed, a second lens group 3, a first lens group 4 and a protective plate 5 in the order form the object side. The position E.P is the eyepoint.

In the present embodiment, the second lens group 3 having a negative refracting power is comprised of a cemented lens, so as to obtain a higher magnification while maintaining an excellent aberration state. Also, by moving the first lens group 4 along the optical axis, the focal length of the entire eyepiece lens is changed to additionally obtain a diopter adjusting function.

Table 7 shows the specifications in the seventh embodiment.

TABLE 7

| Surface Number | Radius of curvature | Surface distance | Index of refraction | Abbe number |
|---|---|---|---|---|
| (Lens data) | | | | |
| 1 | ∞ (Focal surface) | 0.25 | 1.0 | |
| 2 | ∞ (Flat surface) | 1.2 | 1.49108 | 57.57 |
| 3 | ∞ (Flat surface) | 2.25 | 1.0 | |
| 4 | ∞ (Flat surface) | 86.518 | 1.51680 | 64.10 |
| 5 | ∞ (Flat surface) | 0.5 | 1.0 | |
| 6 | 21.136 | 7.1 | 1.71300 | 53.87 |
| 7 | 96.945 | 8.0 | 1.69895 | 30.13 |
| 8 | 13.330 | D1 | 1.0 | |
| 9 | 21.554 | 5.2 | 1.77250 | 49.60 |
| 10 | 83.401 | D2 | 1 | |
| 11 | ∞ (Flat surface) | 1.0 | 1.52216 | 58.80 |
| 12 | ∞ (Flat surface) | D3 | 1.0 | |
| | E.P | | | |

(Variable distance data)

| Diopter | −2.7 | −1.0 | +1.0 |
|---|---|---|---|
| D1 | 2.5 | 4.7 | 7.4 |
| D2 | 9.5 | 7.3 | 4.6 |
| D3 | 18.1 | 20.0 | 22.5 |
| fe | 61.4 | 60.7 | 59.8 |

(Values corresponding to the conditions)

(1) SF1 = −1.697
(2) SF2 = +4.415
(5) Dx/fe = 0.086
|ν6−ν7| = 23.74

FIGS. 14A through 14D, FIGS. 14E through 14H, and FIGS. 14I through 14L are views for showing aberrations, respectively, when the diopter is on the most negative side, when the diopter is −1 dpt, and when the diopter is on the most positive side. As clearly seen from the aberration views, the aberrations are excellently corrected over a wide range of the diopter.

Eighth Embodiment

Figure 15:
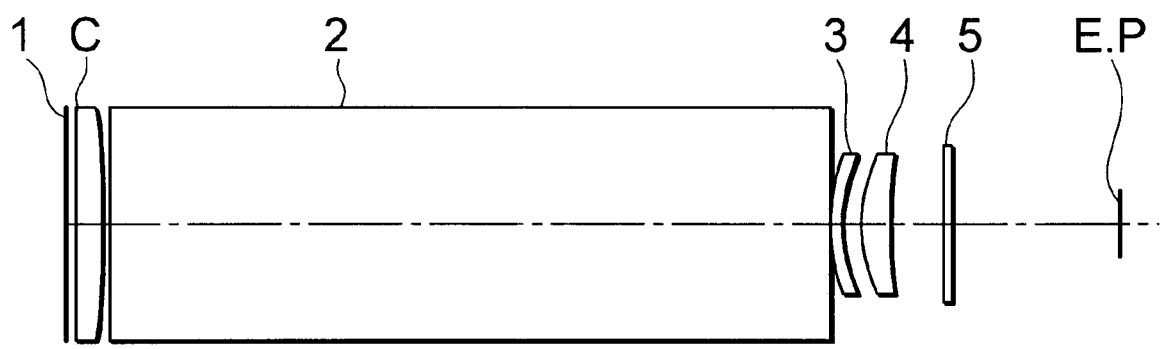
FIG. 15 is a view for showing a lens configuration of a finder optical system having an eyepiece lens according to an eighth embodiment of the present invention.

FIG. 15 is a view for showing a cross section of a finder optical system which has an eyepiece lens according to an eighth embodiment of the present invention and a fixed diopter of −1 dpt. The finder optical system is comprised of a focal surface 1, a condenser lens C, a block part 2 in which an erect system is developed, a second lens group 3, a first lens group 4 and a protective plate 5 in the order form the object side. The position E.P is the eyepoint.

In the present embodiment, a condenser lens is additionally attached to the eyepiece lens of the third embodiment, so as to achieve correction of a distortion and a high magnification. Also, by moving the first lens group 4 along the optical axis, the focal length of the entire eyepiece lens is changed to additionally obtain a diopter adjusting function. The surface of the condenser lens may be formed as the focal surface.

Table 8 shows the specifications in the eighth embodiment.

TABLE 8

| Surface Number | Radius of curvature | Surface distance | Index of refraction | Abbe number |
|---|---|---|---|---|
| (Lens data) | | | | |
| 1 | ∞ (Focal surface) | 0.25 | 1.0 | |
| 2 | ∞ (Flat surface) | 3.2 | 1.49108 | 57.57 |
| 3 | −103.000 | 0.75 | 1.0 | |
| 4 | ∞ (Flat surface) | 92.797 | 1.51680 | 64.10 |
| 5 | ∞ (Flat surface) | 0.1 | 1.0 | |
| 6 | 27.924 | 1.0 | 1.80518 | 25.35 |
| 7 | 16.875 | D1 | 1.0 | |
| 8 | 18.224 | 3.9 | 1.80411 | 46.55 |
| 9 | 57.551 | D2 | 1.0 | |
| 10 | ∞ | 1.0 | 1.52216 | 58.80 |
| 11 | ∞ (Flat surface) | D3 | 1.0 | |
| | | E.P | | |
| (Variable distance data) | | | | |
| Diopter | −2.5 | −1.0 | +1.0 | |
| D1 | 1.0 | 2.5 | 4.6 | |
| D2 | 8.3 | 6.8 | 4.7 | |
| D3 | 19.5 | 20.8 | 22.1 | |
| fe | 72.0 | 70.2 | 67.7 | |

(Values corresponding to the conditions)

(1) SF1 = −1.927
(2) SF2 = +4.055
(6) fc/fe = 2.99

FIGS. 16A through 16D, FIGS. 16E through 16H, and FIGS. 16I through 16L are views for showing aberrations, respectively, when the diopter is on the most negative side, when the diopter is −1 dpt, and when the diopter is on the most positive side. As clearly seen from the aberration views, the aberrations are excellently corrected over a wide range of the diopter.

Ninth Embodiment

Figure 17:
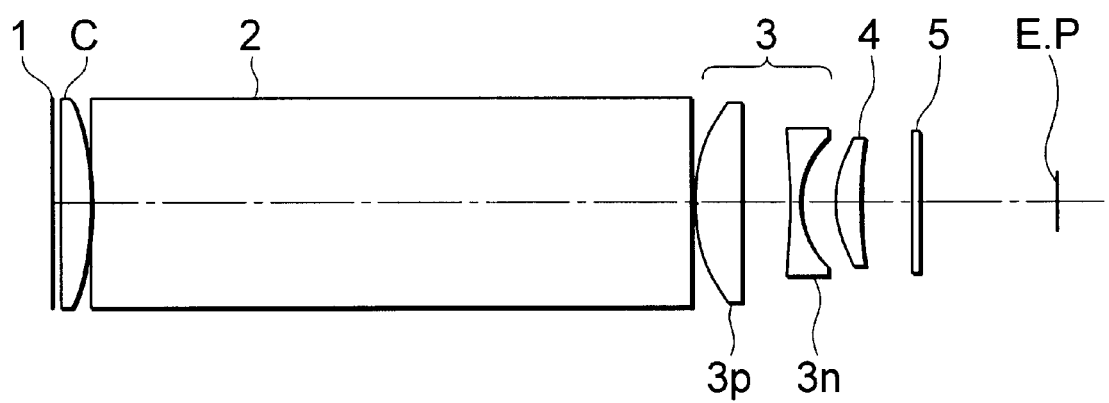
FIG. 17 is a view for showing a lens configuration of a finder optical system having an eyepiece lens according to a ninth embodiment of the present invention.

FIG. 17 is a view for showing a cross section of a finder optical system which has an eyepiece lens according to a ninth embodiment of the present invention and a fixed diopter of −1 dpt. The finder optical system is comprised of a focal surface 1, a condenser lens C, a block part 2 in which an erect system is developed, a second lens group 3, a first lens group 4 and a protective plate 5 in the order form the object side. Then, the second lens group 3 is further comprised of a positive lens group 3p and a negative lens group 3n. The position E.P is the eyepoint.

In the present embodiment, a condenser lens is additionally attached to the eyepiece lens of the fourth embodiment, so as to achieve correction of a distortion and a high magnification. Also, in the present embodiment, by moving the first lens group 4 along the optical axis, the focal length of the entire eyepiece lens is changed to additionally obtain the diopter adjusting function. The surface of the condenser lens may be formed as the focal surface.

Table 9 shows the specifications in the ninth embodiment.

TABLE 9

| Surface Number | Radius of curvature | Surface distance | Index of refraction | Abbe number |
|---|---|---|---|---|
| (Lens data) | | | | |
| 1 | ∞ (Focal surface) | 0.25 | 1.0 | |
| 2 | ∞ (Flat surface) | 3.7 | 1.49108 | 57.57 |
| 3 | −39.000 | 0.25 | 1.0 | |
| 4 | ∞ (Flat surface) | 86.518 | 1.51680 | 64.10 |
| 5 | ∞ (Flat surface) | 0.5 | 1.0 | |
| 6 | 22.856 | 6.9 | 1.71300 | 53.93 |
| 7 | 800.000 | 6.5 | 1.0 | |
| 8 | −102.597 | 1.5 | 1.58300 | 29.90 |
| *9 | 12.259 | D1 | 1.0 | |
| 10 | 21.022 | 3.5 | 1.71300 | 53.93 |
| 11 | 120.000 | D2 | 1.0 | |
| 12 | ∞ (Flat surface) | 1.0 | 1.52216 | 58.80 |
| 13 | ∞ (Flat surface) | D3 | 1.0 | |
| | | E.P | | |
| (Aspherical data) | | | | |
| Surface number | | K | C3 | |
| *9 | | 1.0 | −6.158 × 10$^{-8}$ | |
| (Variable distance data) | | | | |
| Diopter | −3.0 | −1.0 | +1.0 | |
| D1 | 2.8 | 5.2 | 7.7 | |
| D2 | 9.2 | 6.8 | 4.2 | |
| D3 | 17.8 | 20.2 | 22.4 | |
| fe | 53.2 | 57.1 | 62.0 | |

(Values corresponding to the conditions)

(1) SF1 = −1.425
(2) SF2p = −1.059
(3) fc/fe = 1.39

FIGS. 18A through 18D, FIGS. 18E through 18H, and FIGS. 18I through 18L are views for showing aberrations, respectively, when the diopter is on the most negative side, when the diopter is −1 dpt, and when the diopter is on the most positive side. As clearly seen from the aberration views, the aberrations are excellently corrected over a wide range of the diopter.

Tenth Embodiment

Figure 19:
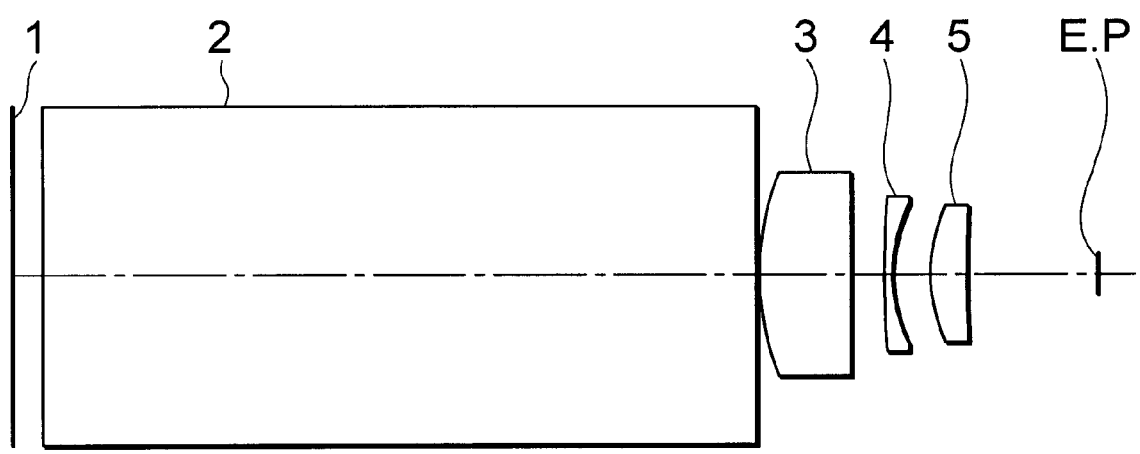
FIG. 19 is a view for showing a lens configuration of a finder optical system having an eyepiece lens according to a tenth embodiment of the present invention.

FIG. 19 is a view for showing a cross section of a finder optical system which has an eyepiece lens according to a tenth embodiment of the present invention and a fixed diopter of −1 dpt. The finder optical system is comprised of a focal surface 1, a block part 2 in which an erect system is developed, a first lens group 3, a second lens group 4 and a third lens group 5 in the order form the object side. The position E is the eyepoint.

In the present embodiment, by moving the second lens group 4 along the optical axis, the focal length of the entire eyepiece lens is changed to change the diopter.

Table 10 shows the specifications in the tenth embodiment.

TABLE 10

| Surface Number | Radius of curvature | Surface distance | Index of refraction | Abbe number |
|---|---|---|---|---|
| (Lens data) | | | | |
| 1 | ∞ (Focal surface) | 3.3 | 1.0 | |
| 2 | ∞ (Flat surface) | 82.0 | 1.51680 | 64.10 |
| 3 | ∞ (Flat surface) | 0.3 | 1.0 | |
| 4 | 30.000 | 10.0 | 1.51680 | 64.10 |
| 5 | 200.000 | D1 | 1.0 | |
| 6 | 150.000 | 1.0 | 1.58300 | 29.90 |
| 7 | 20.000 | D2 | 1.0 | |
| 8 | 17.100 | 4.0 | 1.51680 | 64.10 |
| 9 | 82.650 | D3 E.P | 1.0 | |

(Variable distance data)

| Diopter | −3.0 | −1.0 | +1.0 | (unit: dpt) |
|---|---|---|---|---|
| D1 | 7.0 | 4.0 | 0.5 | |
| D2 | 1.0 | 4.0 | 7.5 | |
| D3 | 12.5 | 15.0 | 15.0 | |
| fe | 69.4 | 67.6 | 64.7 | |

(Values corresponding to the conditions)

(1) Dp1/fe = 0.147
   (Dp1: the thickness of the first lens group)
(2) Dt/fe = 0.340
(3) SF1 = 1.352 (the first group shape factor)

FIGS. 20A through 20D, FIGS. 20E through 20H, and FIGS. 20I through 20L are views for showing aberrations, respectively, when the diopter is on the most negative side, when the diopter is −1 dpt, and when the diopter is on the most positive side (spherical aberration, astigmatism, coma and distortion, in this order from the left). As clearly seen from the aberration views, the aberrations are excellently corrected over a wide range of the diopter.

Eleventh Embodiment

A lens configuration of an eyepiece lens according to an eleventh embodiment of the present invention is substantially the same as that of the foregoing tenth embodiment, so that description thereof will be omitted. Table 11 shows the specifications in the eleventh embodiment.

TABLE 11

| Surface Number | Radius of curvature | Surface distance | Index of refraction | Abbe number |
|---|---|---|---|---|
| (Lens data) | | | | |
| 1 | ∞ (Focal surface) | 3.3 | 1.0 | |
| 2 | ∞ (Flat surface) | 82.0 | 1.51680 | 64.10 |
| 3 | ∞ (Flat surface) | 0.3 | 1.0 | |
| 4 | 22.250 | 5.0 | 1.77278 | 49.45 |
| 5 | 61.000 | D1 | 1.0 | |
| 6 | 95.000 | 1.0 | 1.72825 | 28.34 |
| 7 | 14.821 | D2 | 1.0 | |
| 8 | 17.680 | 12.0 | 1.71300 | 53.92 |
| 9 | 70.730 | D3 E.P | 1.0 | |

(Variable distance data)

| Diopter | −3.0 | −1.0 | +2.0 | (unit: dpt) |
|---|---|---|---|---|
| D1 | 5.4 | 3.7 | 0.7 | |
| D2 | 1.6 | 3.3 | 6.3 | |
| D3 | 8.0 | 15.0 | 15.0 | |
| fe | 59.0 | 58.4 | 55.8 | |

TABLE 11-continued (Values corresponding to the conditions)

(1) Dp3/fe = 0.205
   (Dp3: the thickness of the third lens group)
(2) Dt/fe = 0.428
(3) SF3 = 1.666 (the third group shape factor)

FIGS. 21A through 21D, FIGS. 21E through 21H, and FIGS. 21I through 21L are views for showing aberrations, respectively, when the diopter is on the most negative side, when the diopter is −1 dpt, and when the diopter is on the most positive side (spherical aberration, astigmatism, coma and distortion, in this order from the left). As clearly seen from the aberration views, the aberrations are excellently corrected over a wide range of the diopter.

Twelfth Embodiment

A lens configuration of an eyepiece lens according to a twelfth embodiment of the present invention is substantially the same as that of the foregoing tenth embodiment, so that description thereof will be omitted. Table 12 shows the specifications in the twelfth embodiment.

TABLE 12

| Surface Number | Radius of curvature | Surface distance | Index of refraction | Abbe number |
|---|---|---|---|---|
| (Lens data) | | | | |
| 1 | ∞ (Focal surface) | 2.0 | 1.49108 | 57.57 |
| 2 | ∞ (Flat surface) | 0.5 | 1.0 | |
| 3 | ∞ (Flat surface) | 4.7 | 1.56882 | 56.04 |
| 4 | −65.000 | 1.8 | 1.0 | |
| 5 | ∞ (Flat surface) | 96.4 | 1.51680 | 64.10 |
| 6 | ∞ (Flat surface) | 0.1 | 1.0 | |
| 7 | 44.000 | 11.0 | 1.71300 | 53.92 |
| 8 | 138.600 | D1 | 1.0 | |
| 9 | 128.700 | 2.0 | 1.72825 | 28.34 |
| 10 | 24.538 | D.2 | 1.0 | |
| 11 | 24.270 | 11.0 | 1.71300 | 53.92 |
| 12 | 121.372 | D3 E.P | 1.0 | |

(Variable distance data)

| Diopter | −3.0 | −1.0 | +0.5 | (unit: dpt) |
|---|---|---|---|---|
| D1 | 6.6 | 3.4 | 0.9 | |
| D2 | 0.4 | 3.6 | 6.1 | |
| D3 | 15.0 | 18.0 | 18.0 | |
| fe | 83.5 | 79.1 | 75.5 | |

(Values corresponding to the conditions)

(1) Dp1/fe = 0.138
   (Dp1: the thickness of the first group lens)
(1) Dp3/fe = 0.138
   (Dp3: the thickness of the third group lens)
(2) Dt/fe = 0.391
(3) SF1 = 1.930 (the first group shape factor)
(3) SF3 = 1.499 (the third group shape factor)

FIGS. 22A through 22D, FIGS. 22E through 22H, and FIGS. 22I through 22L are views for showing aberrations, respectively, when the diopter is on the most negative side, when the diopter is −1 dpt, and when the diopter is on the most positive side (spherical aberration, astigmatism, coma and distortion, in this order from the left). As clearly seen from the aberration views, the aberrations are excellently corrected over a wide range of the diopter.

As described above, according to the present invention, it is possible to provide an eyepiece lens having an excellent aberration performance with a sufficiently long eye relief and high magnification, and preferably an eyepiece lens further comprising the diopter adjusting function.

What is claimed is:

1. An eyepiece lens for observing an image formed by an objective lens through an erect system, at least comprising a first lens group having a positive refracting power and a second lens group having a negative refracting power in the order from the side of an observer, and satisfying the following condition:

$$-3 < SF1 < -1 \quad (1)$$

where SF1 indicates a shape factor of said first lens group, and SF indicates a shape factor of the lens group, which is defined by:

$$SF = (Rs+RE)/(Rs-RE),$$

where Rs indicates a radius of curvature of a lens surface which is closest to the object side and RE indicates a radius of curvature of a lens surface which is closest to the observer side.

2. An eyepiece lens according to claim 1, wherein said second lens group satisfies the following condition:

$$1 < SF2 < 6 \quad (2)$$

where SF2 indicates the shape factor of said second lens group.

3. An eyepiece lens according to claim 2, wherein said second lens group is comprised of at least a lens group having a negative refracting power and a lens group having a positive refracting power in the order from the observer side, and said positive lens group in said second lens group satisfies the following condition:

$$-2 < SF2p < -1 \quad (3)$$

where SF2p indicates the shape factor of said positive lens group in said second lens group.

4. An eyepiece lens according to claim 1, wherein said first lens group having the positive refracting power or a lens component having a positive refracting power in said first lens group is moved along the optical axis so as to adjust the diopter.

5. An eyepiece lens according to claim 3, wherein said negative lens group for satisfying the following condition in said second lens group is moved along the optical axis so as to adjust the diopter:

$$0.5 < |f2n|/f1 < 1 \quad (4)$$

where f2n indicates a focal length of said negative lens group in said second lens group, and f1 indicates a focal length of said first lens group.

6. An eyepiece lens according to claim 1, wherein at least one lens group in said lens group satisfies the following condition:

$$Dx/fe \geq -0.08 \quad (5)$$

where Dx indicates a thickness of the lens group, and fe indicates a focal length of said eyepiece lens at the dopier of −1.

7. An eyepiece lens according to claim 1, wherein a condenser lens satisfying the following condition is inserted between an imaging surface and the erect system:

$$1 < fc/fe < 3 \quad (6)$$

where fc indicates a focal length of the condenser lens, and fe indicates a focal length of the entire eyepiece lens at the diopter of −1.

8. An eyepiece lens according to claim 1, wherein said second lens group is comprised of at least a lens group having a negative refracting power and a lens group having a positive refracting power in the order from the observer side, and said positive lens group in said second lens group satisfies the following condition:

$$-2 < SF2p < -1 \quad (3)$$

where SF2p indicates the shape factor of said positive lens group in said second lens group.

9. An eyepiece lens according to claim 8, wherein said negative lens group for satisfying the following condition in said second lens group is moved along the optical axis so as to adjust the diopter:

$$0.5 < |f2n|/f1 < 1 \quad (4)$$

where f2n indicates a focal length of said negative lens group in said second lens group, and f1 indicates a focal length of said first lens group.

10. An eyepiece lens for observing an image of an object through an erect system, comprising a first lens group having a positive refracting power, a second lens group having a negative refracting power, and a third lens group having a positive refracting power, wherein at least one lens group out of said lens groups having the positive refracting power satisfies the following condition:

$$Dp/fe > 0.1 \quad (7)$$

where Dp indicates a thickness of said lens group having the positive refracting power, and fe indicates a focal length of said eyepiece lens optical system at the diopter of −1.

11. An eyepiece lens according to claim 10, further satisfying the following condition:

$$Dt/fe > 0.2 \quad (8)$$

where Dt indicates a total thickness of said eyepiece lens.

12. An eyepiece lens according to claim 11, wherein said lens group having the positive refracting power has a positive meniscus lens with a convex surface facing the object side.

13. An eyepiece lens according to claim 12, wherein said positive meniscus lens satisfies the following condition:

$$1.3 < SF < 2 \quad (9)$$

where SF indicates a shape factor of said positive meniscus lens, which is defined by the following formula:

$$SF = (R2+R1)/(R2-R1),$$

where R1 and R2 respectively indicate a radiuses of curvature of said positive meniscus lens in the order from the object side.

14. An eyepiece lens according to claim 10, wherein said lens group having the positive refracting power has a positive meniscus lens with a convex surface facing the object side.

15. An eyepiece lens according to claim 14, wherein said positive meniscus lens satisfies the following condition:

$$1.3 < SF < 2 \tag{9}$$

where SF indicates a shape factor of said positive meniscus lens, which is defined by the following formula:

$$SF = (R2+R1)/(R2-R1),$$

where R1 and R2 respectively indicate the radiuses of curvature of said positive meniscus lens in the order from the object side.

* * * * *